(12) United States Patent
Inoue et al.

(10) Patent No.: US 10,113,072 B2
(45) Date of Patent: Oct. 30, 2018

(54) ELECTROPHORETIC PARTICLE, METHOD OF MANUFACTURING ELECTROPHORETIC PARTICLE, ELECTROPHORESIS DISPERSION LIQUID, ELECTROPHORESIS SHEET, ELECTROPHORESIS DEVICE, AND ELECTRONIC APPARATUS

(71) Applicant: Seiko Epson Corporation, Tokyo (JP)

(72) Inventors: Keiichi Inoue, Chino (JP); Shinobu Yokokawa, Okaya (JP); Kiyoshi Nakamura, Matsumoto (JP); Tomoyuki Ushiyama, Chino (JP); Masahiko Nakazawa, Matsumoto (JP)

(73) Assignee: E Ink Corporation, Billerica, MA (US)

( * ) Notice: Subject to any disclaimer, the term of this patent is extended or adjusted under 35 U.S.C. 154(b) by 239 days.

(21) Appl. No.: 15/255,890

(22) Filed: Sep. 2, 2016

(65) Prior Publication Data

US 2017/0081528 A1   Mar. 23, 2017

(30) Foreign Application Priority Data

Sep. 18, 2015   (JP) .................................. 2015-185320

(51) Int. Cl.

| | |
|---|---|
| *B32B 5/16* | (2006.01) |
| *C09D 5/44* | (2006.01) |
| *G02F 1/167* | (2006.01) |
| *C08G 77/20* | (2006.01) |
| *G02F 1/17* | (2006.01) |
| *C09D 183/14* | (2006.01) |

(52) U.S. Cl.
CPC ............ *C09D 5/4411* (2013.01); *C09D 5/448* (2013.01); *G02F 1/167* (2013.01); *C08G 77/20* (2013.01); *C09D 5/44* (2013.01); *C09D 183/14* (2013.01); *G02F 1/172* (2013.01); *G02F 2001/1678* (2013.01)

(58) Field of Classification Search
CPC .. G02F 1/167; G02F 2001/1678; G02F 1/172; C08G 77/20; C09D 183/14; C09D 5/44; C09D 5/4411; C09D 5/448
USPC ..................... 359/296; 430/32; 345/85, 107; 428/357, 402, 403, 407; 526/279; 523/203
See application file for complete search history.

(56) References Cited

U.S. PATENT DOCUMENTS 9,798,215 B2 * 10/2017  Aoki ........................ G02F 1/167
9,804,472 B2 * 10/2017  Yokokawa .............. G02F 1/167
(Continued)

FOREIGN PATENT DOCUMENTS

| JP | 2013-156381 | 8/2013 |
| JP | 2016-186625 A | 10/2016 |

*Primary Examiner* — Evelyn A Lester
(74) *Attorney, Agent, or Firm* — Antranig Baronian

(57) ABSTRACT

An electrophoretic particle includes a base particle (particle), a first compound, a second compound, and a third compound bonded to the base particle. The first compound is a polymer having a dispersion portion derived from a first monomer, and a bonding portion derived from a second monomer, and is connected to the base particle at the bonding portion. The second compound includes a nonpolar group and a second functional group and is connected to the base particle at the second functional group. The third compound includes a charging group and a second functional group and is connected to the base particle at the second functional group.

20 Claims, 8 Drawing Sheets

(56) References Cited

U.S. PATENT DOCUMENTS

| | | | | |
|---|---|---|---|---|
| 2007/0115533 A1* | 5/2007 | Kanbe | ..................... | B01J 13/02 |
| | | | | 359/296 |
| 2013/0265632 A1* | 10/2013 | Aoki | ...................... | G02F 1/167 |
| | | | | 359/296 |
| 2015/0205180 A1* | 7/2015 | Yokokawa | .............. | G02F 1/167 |
| | | | | 359/296 |
| 2015/0232701 A1* | 8/2015 | Aoki | ................... | C09D 183/10 |
| | | | | 359/296 |
| 2015/0323850 A1* | 11/2015 | Shitagami | ............ | C08F 130/08 |
| | | | | 359/296 |
| 2016/0266462 A1* | 9/2016 | Shitagami | ............... | G02F 1/167 |
| 2016/0280934 A1* | 9/2016 | Inoue | .................. | C09D 183/10 |
| 2016/0282696 A1* | 9/2016 | Yokokawa | ............. | G02F 1/167 |

* cited by examiner

ELECTROPHORETIC PARTICLE, METHOD OF MANUFACTURING ELECTROPHORETIC PARTICLE, ELECTROPHORESIS DISPERSION LIQUID, ELECTROPHORESIS SHEET, ELECTROPHORESIS DEVICE, AND ELECTRONIC APPARATUS

BACKGROUND

1. Technical Field

The present invention relates to an electrophoretic particle, a method of manufacturing an electrophoretic particle, an electrophoresis dispersion liquid, an electrophoresis sheet, an electrophoresis device, and an electronic apparatus.

2. Related Art

In general, it is known that the fine particles are moved (migrate) in the liquid due to Coulomb force when an electrical field is operated in a dispersion system in which fine particles are dispersed in a liquid. This phenomenon is known as electrophoresis, and in recent years, electrophoresis display devices in which desired information (images) is displayed using electrophoresis have garnered attention as new display devices.

The electrophoresis display device has display memory properties in a state in which application of a voltage is stopped and wide viewing angle properties, and is capable of high contrast display with low power consumption.

Since electrophoresis display devices are non-light emitting display devices, electrophoresis display devices are better for the eyes compared to a light-emitting display device such as a cathode ray tube.

Such an electrophoresis display device provided with a dispersion in which the electrophoretic particles are dispersed in a solvent as an electrophoresis dispersion liquid arranged between a pair of substrates having electrodes is known.

In an electrophoresis dispersion liquid with this configuration, electrophoretic particles including particles with positive chargeability and particles with negative chargeability are used, and, accordingly, it is possible for desired information (images) to be displayed by applying a voltage between the pair of substrates (electrodes).

Particles provided with a coating layer 503 in which a polymer 533 is connected to a base material particle 502 are generally used as the electrophoretic particles 501 (refer to FIG. 10), and the electrophoretic particles 501 can be dispersed and charged in the electrophoresis dispersion liquid by using a configuration provided with such a coating layer 503 (polymer 533).

The electrophoretic particles with this configuration are manufactured as follows, for example, using atom transfer radical polymerization reaction (ATRP).

That is, after base material particles 502 are prepared, and a silane coupling agent 531 having a polymerization initiation group is bonded to the surface of the base material particles 502, electrophoretic particles 501 are manufactured through imparting characteristics such as dispersibility by providing a polymer 533 while forming a polymerization portion 532 at which a monomer is polymerized by living radical polymerization with the polymerization initiation group as an origin (for example, refer to JP-A-2013-156381).

Incidentally, regarding whether the electrophoretic particles 501 have positive chargeability or negative chargeability in the electrophoretic particles 501 with this configuration, because the base material particles 502 themselves have inherent chargeability it is possible for a desired chargeability to be imparted on the electrophoretic particles 501 by selecting, as appropriate, the type of base material particle 502.

However, in the electrophoresis display device, although it is necessary to control the charging amount of the electrophoretic particles 501 in order to set the migration speed of the electrophoretic particles 501 to a suitable speed, it is difficult to control the charging amount of the electrophoretic particles 501 to a suitable range by simply providing the polymer 533 on the base material particle 502.

SUMMARY

An advantage of some aspects of the invention is to provide electrophoretic particles which include a uniform dispersion capacity in the electrophoresis dispersion liquid and for which the charging amount is set to a suitable range, a method of manufacturing an electrophoretic particle that is able to manufacture the electrophoretic particle, and a high reliability electrophoresis dispersion liquid, electrophoresis sheet, electrophoresis device, and electronic apparatus in which the electrophoretic particles are used.

This advantage is achieved by the invention described below.

According to an aspect of the invention, there is provided an electrophoretic particle including: a particle including a first functional group on a surface; and a first compound, a second compound, and a third compound bonded to the particle, in which the first compound is a block copolymer that includes a dispersion portion derived from a first monomer including a site that contributes to dispersibility in a dispersion medium, and a bonding portion derived from a second monomer including a second functional group having reactivity with the first functional group, and is connected to the particle by reacting the first functional group and the second functional group in the bonding portion, the second compound has a lower molecular weight than the first compound, includes a non-polar group and the second functional group, and is connected to the particle by the second functional group reacting with the first functional group, and the third compound has a lower molecular weight than the first compound, includes a charging group and the second functional group, and is connected to the particle by the second functional group reacting with the first functional group.

Accordingly, electrophoretic particle which is provided with a uniform dispersion capacity in the electrophoresis dispersion liquid and for which the charging amount is set to a suitable range can be formed.

In the electrophoretic particles, it is preferable that the second compound be a silane coupling agent that includes the non-polar group and the second functional group.

Accordingly, the second compound can be reliably interposed in a region between the first compounds and the third compounds connected to the particles. As a result, the dispersibility of the electrophoretic particles in the electrophoresis dispersion liquid can be made superior.

In the electrophoretic particle, it is preferable that the second compound be a block copolymer that includes a non-polar portion derived from a third monomer including the non-polar group, and the bonding portion derived from the second monomer including the second functional group.

Accordingly, the second compound can be reliably interposed in a region between the first compounds and the third compounds connected to the particles. As a result, the dispersibility of the electrophoretic particles in the electrophoresis dispersion liquid can be made superior.

In the electrophoretic particle, it is preferable that the non-polar group be a hydrocarbon group.

Because these groups exhibit superior non-polarity, aggregation between the electrophoretic particles can be more precisely suppressed or prevented.

In the electrophoretic particle, it is preferable that the molecular weight of the second compound be 100 or more to 1,000 or less.

Accordingly, the steric hindrance of the second compound is reduced and the second compound can be more reliably interposed in a region between the first compounds and the third compounds connected to the particles. As a result, the dispersibility of the electrophoretic particles in the electrophoresis dispersion liquid can be made superior.

In the electrophoretic particle, it is preferable that the third compound be a silane coupling agent that includes the charging group and the second functional group.

Accordingly, the third compound can be reliably interposed in a region between the first compounds and the second compounds connected to the particles. As a result, chargeability can be reliably imparted to the electrophoretic particles in the electrophoresis dispersion liquid.

In the electrophoretic particle, it is preferable that the third compound be a block copolymer that includes a charging portion derived from the third monomer including the charging group, and the bonding portion derived from the second monomer including the second functional group.

Accordingly, the third compound can be reliably interposed in a region between the first compounds and the second compounds connected to the particles. As a result, it is possible to reliably impart chargeability to the electrophoretic particles in the electrophoresis dispersion liquid.

In the electrophoretic particle, it is preferable that the charging group include at least one of a polarization group and an ionic group.

Among these, the third compound can reliably provide positive or negative chargeability.

In the electrophoretic particle, it is preferable that the molecular weight of the third compound be 100 or more to 1,000 or less.

Accordingly, the steric hindrance of the third compound is reduced and the third compound can be more reliably interposed in a region between the first compounds and the second compounds connected to the particles. As a result, chargeability can be reliably imparted to the electrophoretic particles in the electrophoresis dispersion liquid.

In the electrophoretic particle, it is preferable that, in the first compound, the bonding portion be formed by 1 or more to 10 or less units derived from the second monomer.

Accordingly, a chemical bond can be formed between the bonding portion and the particle, and the block copolymer can be reliably connected to the particle.

In the electrophoretic particle, it is preferable that, in the first compound, the first monomer be a silicone macromonomer represented by the following general formula (I).

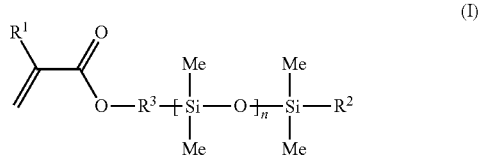

[in the formula, $R^1$ is a hydrogen atom or a methyl group, $R^2$ is a hydrogen atom or an alkyl group having 1 to 4 carbon atoms, $R^3$ is a structure including one type from an alkyl group having 1 to 6 carbon atoms and an ether group of ethylene oxide or propylene oxide, and n is an integer of 0 or more]

Accordingly, when using a medium with silicone oil as a main component as the dispersion medium included in the electrophoresis dispersion liquid, the electrophoretic particles that include the dispersion portion obtained by polymerizing the first monomer can have superior dispersibility and be dispersed in the dispersion medium because the first monomer exhibits superior affinity with respect to the dispersion medium.

In the electrophoretic particle, it is preferable that the weight average molecular weight of the dispersion portion be 10,000 or more to 100,000 or less.

Accordingly, the electrophoretic particles provided with the dispersion portion can have superior dispersibility and be dispersed in the dispersion medium.

In the electrophoretic particle, it is preferable that, when the weight average molecular weight of the dispersion portion is A and the molecular weight of the second compound is B, A/B be 10 or more to 1,000 or less.

Accordingly, the steric hindrance of the second compound is reduced and the second compound can be more reliably interposed in a region between the first compounds connected to the particles. As a result, the dispersibility of the electrophoretic particles in the electrophoresis dispersion liquid can be made superior.

According to another aspect of the invention, there is provided a method of manufacturing an electrophoretic particle of the above aspects of the invention, the method including: connecting the third compound to the particle by reacting the first functional group included in the surface of the particle and the second functional group included in the third compound; connecting the first compound to the particle at the bonding portion by reacting the first functional group included in the surface of the particle and the second functional group included in the first compound; and connecting the second compound to the particle by reacting the first functional group included in the surface of the particle and the second functional group included in the second compound.

Accordingly, an electrophoretic particle which is provided with a uniform dispersion capacity in the electrophoresis dispersion liquid and for which the charging amount is set to a suitable range can be manufactured.

According to another still aspect of the invention, there is provided an electrophoresis dispersion liquid including: the electrophoretic particles of the above aspects of the invention; and a dispersion medium.

Accordingly, an electrophoresis dispersion liquid provided with electrophoretic particles which include a uniform dispersion capacity, and for which the charging amount is set to a suitable range can be provided.

In the electrophoresis dispersion liquid, it is preferable that the dispersion medium be silicone oil.

Silicone oil has excellent weather resistance because of not having unsaturated bonds, and has the further advantage of high safety.

According to still another aspect of the invention, there is provided an electrophoresis sheet including: a substrate; and a structure that is provided on the substrate, and that accommodates the electrophoresis dispersion liquid of the above aspects of the invention.

Accordingly, a high performance and high reliability electrophoresis sheet is obtained.

According to still another aspect of the invention, there is provided an electrophoresis device including the electrophoresis sheet of the above aspects of the invention.

Accordingly, a high performance and high reliability electrophoresis device is obtained.

According to still another aspect of the invention, there is provided an electronic apparatus including the electrophoresis device of the above aspects of the invention.

Accordingly, a high performance and high reliability electronic apparatus is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Below, the electrophoretic particles, the method of manufacturing the electrophoretic particles, the electrophoresis dispersion liquid, the electrophoresis sheet, the electrophoresis device, and the electronic apparatus of the invention will be described in detail based on favorable embodiments illustrated in the attached drawings.

Electrophoretic Particle

First Embodiment

First, a first embodiment of the electrophoretic particles of the invention will be described.

Figure 1:
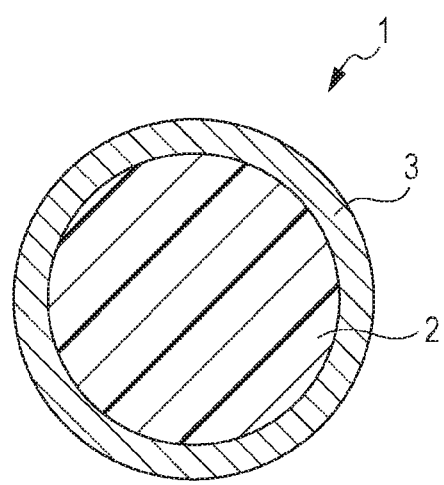
FIG. 1 is a longitudinal cross-sectional view illustrating a first embodiment of an electrophoretic particle of the invention.
Figure 2:
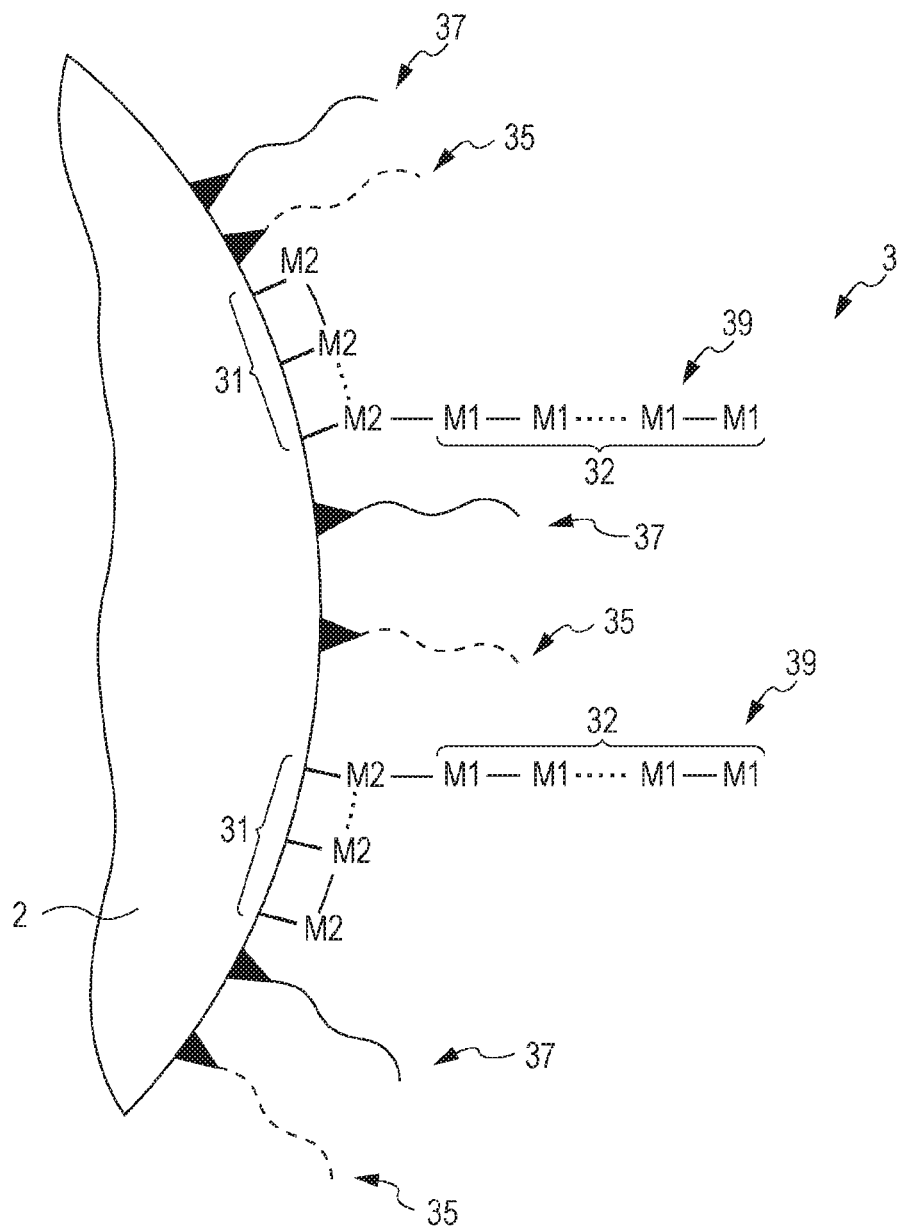
FIG. 2 is a schematic view of a first compound, a second compound, and a third compound included in a first embodiment of the electrophoretic particles of the invention.

FIG. 1 is a longitudinal cross-sectional view illustrating the first embodiment of an electrophoretic particle of the invention, and FIG. 2 is a schematic view of first, second, and third compounds included in the first embodiment of the electrophoretic particles of the invention.

The electrophoretic particle 1 includes a base particle (particle) 2 and a coating layer 3 provided on the surface of the base particle 2.

At least one type of pigment particle, resin particle or composite particle thereof is favorably used as the base particle 2. These particles are easily manufactured.

Examples of the pigment that forms the pigment particles include black pigments such as aniline black, carbon black, and titanium black, white pigments such as titanium dioxide, titanium trioxide, barium sulfate, zinc sulfide, and silicon dioxide, azo pigments such as monoazo, diazo, and polyazo, yellow pigments such as isoindolinone, chrome yellow, cadmium yellow, titanium yellow, and antimony, red pigments such as monoazo, diazo, and polyazo, red pigments such as quinacridone red, and chrome vermillion, blue pigments such as phthalocyanine blue, indanthrene blue, prussian blue, ultramarine, and cobalt blue, and green pigments such as phthalocyanine green, and it is possible to use one type or a combination of two or more types thereof.

Examples of the resin material that forms the resin particles include acrylic resins, urethane resins, urea resins, epoxy resins, polystyrene, and polyester, and it is possible to use one type or a combination of two or more types thereof.

Examples of the composite particles include particles subjected to a coating process by coating the surface of a pigment particle with a resin material, particles subjected to a coating process by coating the surface of a resin particle with a pigment, and particles configured by a mixture in which a pigment and a resin material are mixed as an appropriate compositional ratio.

It is possible to set the color of the electrophoretic particles 1 to a desired color by selecting, as appropriate, the type of pigment particles, resin particles and composite particles used as the base particle 2.

It is necessary that the base particles 2 include (exposed) a first functional group that is able to bond (react) to a bonding portion 31 of the first compound 39, described later, and the second functional group included in the second compound 37 and the third compound 35 in the surface thereof. However, because there are cases where a functional group is not included according to the type of pigment particles, resin particles and composite particles, in this case, the particles may be subjected in advance to a functional group introduction process such as acid treatment, basic treatment, UV treatment, ozone treatment, and plasma treatment, and the first functional group introduced to the surface of the base particles 2.

The combination of the first functional group included in the surface of the base particle 2, the bonding portion 31 of the first compound 39, and the second functional group included in the second compound 37 and the third compound 35, is not particularly limited as long as they can react with one another to be connected, and examples thereof include a combination of an isocyanate group and a hydroxyl group or an amino group, a combination of an epoxy group, a glycidyl group or an oxetane group and a carboxyl group, an amino group, a thiol group, a hydroxyl group, or an imidazole group, a combination of an amino group and a halogen group such as Cl, Br, and I, and a combination of an alkoxysilyl group and a hydroxyl group or an alkoxysilyl group. Among these, a combination where the first functional group is a hydroxyl group and the second functional group is an alkoxysilyl group is preferable.

Since it is possible for the base particles 2 in which these are combined, the monomer M2, the second compound 37, and the third compound 35 to each be comparatively easily prepared, and possible for the monomer M2 (block copolymer, described later), the second compound 37, and the third compound 35 to be strongly connected to the surface of the base particle 2, these are preferably used.

Here, an example of a combination in which the first functional group included in the surface of the base particles 2 is a hydroxyl group and the second functional group included in the monomer M2, the second compound 37 and the third compound 35 is an alkoxysilyl group will be described.

Substantially the entire surface of the base particle 2 is covered by the coating layer 3.

The coating layer 3 has a configuration which includes a plurality of the first compound 39, the second compound 37 with a lower molecular weight than the first compound 39, and the third compound 35 with a lower molecular weight than the first compound 39 (refer to FIG. 2).

It should be noted that although the second compound 37 has a non-polar group and a second functional group which has reactivity with the first functional group included in the base particle 2, in the embodiment, the second compound 37 is a silane coupling agent having a non-polar group and a second functional group, and further, although the third compound 35 has a charging group and a second functional group having reactivity with the first functional group included in the base particle 2, in the embodiment, a case where the third compound 35 is a silane coupling agent having a charging group and a second functional group will be described.

The first compound 39 is a block copolymer having a dispersion portion 32 derived from the first monomer M1 (below, also referred to simply as "monomer M1") having a site (group) that contributes dispersibility in the dispersion medium and a bonding portion 31 derived from a second monomer M2 (below, also simply referred to "monomer M2") that includes the second functional group having reactivity with the first functional group. The first compound is connected to the base particles 2 by reacting the first functional group and the second functional group at the bonding portion 31.

By the first compound 39 having this configuration, dispersibility is imparted to the dispersion portion 32 configured by a unit (below, also referred to as a dispersion unit) derived from the monomer M1, the first compound is connected to the base particles 2 by the bonding portion 31 configured by a unit (below, also referred to as a bonding unit) derived from the monomer M2. Therefore, the electrophoretic particles 1 including the first compound 39 with this configuration are able to exhibit a uniform dispersion capacity in the electrophoresis dispersion liquid. That is, the first compound 39 is connected to the surface of the base particle 2 in order for a uniform dispersion capacity to be exhibited by the electrophoretic particles 1 in the electrophoresis dispersion liquid.

The dispersion portion 32 at which the first monomer M1 is polymerized and the bonding portion 31 at which the second monomer M2 is polymerized are connected with the first compound 39. In the first compound 39 with this configuration, the dispersion portion 32 includes a plurality of dispersion units which are formed by polymerizing the monomer M1 and are derived from the monomer M1, and further, the bonding portion 31 includes a plurality of bonding units which are formed by polymerizing the monomer M2, and are derived from the monomer M2. The base particles 2 and the first compound 39 are chemically bonded at the bonding portion 31 included in the first compound 39 via a bonding group formed by reacting the first functional group and the second functional group.

Below, the dispersion portion 32 and the bonding portion 31 that configure the first compound 39 will be described.

The dispersion portion 32 is provided in the surface of the base particles 2 in the coating layer 3 in order to impart dispersibility to the electrophoretic particles 1 in the electrophoresis dispersion liquid, described later.

The dispersion portion 32 is connected to a plurality of dispersion units which are formed by polymerizing a plurality of the monomer M1 having a site that is a side-chain that contributes to dispersibility in the dispersion medium after polymerization in the electrophoresis dispersion liquid, and is derived from the monomer M1.

The monomer M1 includes one polymerizable group that is able to be polymerized by live radical polymerization (radical polymerization), and after further polymerization is a pendant-type monofunctional monomer that includes a site that is a non-ionic side-chain.

By using a monomer M1 that includes a non-ionic side-chain, the dispersion portion 32 formed by live radical polymerization exhibits superior affinity to the dispersion medium included in the electrophoresis dispersion liquid, described later. Therefore, the electrophoretic particles 1 that include the dispersion portion 32 have superior dispersibility and are dispersed in the electrophoresis dispersion liquid without being aggregated.

Examples of the one polymerizable group included in the monomer M1 include those that include a carbon-carbon double bond, such as a vinyl group, a styryl group, and a (meth)acryloyl group.

Examples of the monomer M1 include vinyl monomers, vinyl ester monomers, vinyl amide monomers, (meth)acrylic monomers, (meth)acrylic ester monomers, (meth)acrylic amide monomers and styryl monomers, and more specifically, acrylic monomers such as 1-hexane, 1-heptane, 1-octane, methyl (meth) acrylate, ethyl (meth)acrylate, propyl (meth)acrylate, stearyl (meth)acrylate, lauryl (meth)acrylate, decyl (meth)acrylate, isooctyl (meth)acrylate, isobornyl (meth)acrylate, cyclohexyl (meth)acrylate, and pentafluoro (meth)acrylate, and silicone macromonomers represented by the following general formula (I) and styrene monomers such as such as styrene, 2-methyl styrene, 3-methyl styrene, 4-methyl styrene, 2-ethyl styrene, 3-ethyl styrene, 4-ethyl styrene, 2-propyl styrene, 3-propyl styrene, 4-propyl styrene, 2-isopropyl styrene, 3-isopropyl styrene, 4-isopropyl styrene, and 4-tert-butyl styrene, and it is possible to use one type or a combination of two or more types thereof.

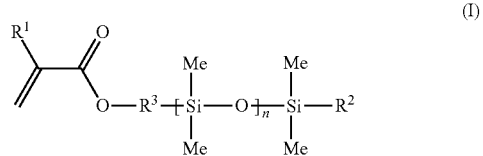

[in the formula, $R^1$ is a hydrogen atom or a methyl group, $R^2$ is a hydrogen atom or an alkyl group having 1 to 4 carbon atoms, $R^3$ is a structure including one type from an alkyl group having 1 to 6 carbon atoms and an ether group of ethylene oxide or propylene oxide, and n is an integer of 0 or more]

Among these, it is preferable that the monomer M1 be a silicone macromonomer represented by the above general formula (I). The dispersion portion that is able to polymerize the monomer M1 exhibits superior dispersibility with respect to the non-polar dispersion medium. That is, although a medium having silicone oil as the main component is used as the dispersion medium included in the electrophoresis dispersion liquid, described later, even in a case of using a hydrocarbon-based solvent as in the silicone oil, superior affinity to the dispersion medium. Therefore, it is possible for the electrophoretic particles 1 provided with the dispersion portion 32 obtained by polymerizing the monomer M1 to have superior dispersibility and be dispersed in the dispersion medium.

In a case of using the silicone macromonomer represented by the above general formula (I) as the monomer M1, it is preferable that the weight average molecular weight thereof be approximately 1,000 or more to 60,000 or less, approximately 3,000 or more to 30,000 or less is more preferable, and approximately 5,000 or more to 20,000 or less is still more preferable. Accordingly, it is possible for the electrophoretic particles 1 provided with the dispersion portion 32 obtained by polymerizing the monomer M1 to have superior dispersibility and be dispersed in the dispersion medium.

It is preferable that the weight average molecular weight of the dispersion portion 32 be 10,000 or more to 100,000 or less, and 10,000 or more to 60,000 or less is more preferable. In particular, in a case of using a silicone macromonomer such as represented by the general formula (I) as the or a case of using a hydrocarbon-based monomer as the monomer M1, it is preferable that the weight average molecular weight of the dispersion portion 32 is 8,000 or more to 50,000 or less and 10,000 or more to 35,000 or less is more preferable. Accordingly, it is possible for the dispersibility of the electrophoretic particles 1 in the electrophoresis dispersion liquid to be made superior.

In one polymer, it is preferable that the number of dispersion units included in the dispersion portion 32 be 1 or more to 20 or less, and 2 or more to 10 or less is more preferable. Accordingly, it is possible for the dispersibility of the electrophoretic particles 1 in the electrophoresis dispersion liquid to more reliably imparted.

It is preferable that the molecular weight distribution of the dispersion portion 32 be 1.2 or less, 1.1 or less is more preferable, and 1.05 or less is still more preferable.

The molecular weight distribution of the dispersion portion 32 represents the ratio (Mw/Mn) between the number average molecular weight (Mn) of the dispersion portion 32 and the weight average molecular weight (Mw) of the dispersion portion 32, it can be said that the dispersion portions 32 exposed in the plurality of electrophoretic particles 1 have a substantially uniform length by the molecular weight distribution of the dispersion portion 32 being within the above ranges. Therefore, each electrophoretic particle 1 exhibits a uniform dispersion capability in the electrophoresis dispersion liquid. It is possible to measure number average molecular weight (Mn) and the weight average molecular weight (Mw) as a polystyrene conversion molecular weight using a gel permeation chromatography (GPC) method.

Furthermore, it is preferable for the dispersion portion 32 to have a molecular weight of the dispersion unit of the base end portion side connected to the bonding portion 31 lower than the molecular weight of the dispersion unit on the tip end side. More specifically, it is preferable that the molecular weight of the side chain included in the monomer M1 that is a precursor of the dispersion unit positioned on the base end portion side is lower than the molecular weight of the side-chain included in the monomer M1 that is a precursor of the dispersion unit positioned on the tip end side. Accordingly, it is possible to make the dispersibility of the electrophoretic particles 1 in the electrophoresis dispersion liquid superior and for the dispersion portion 32 to be highly densely bonded to the surface of the base particles 2.

It should be noted that changes in the molecular weight of the side-chain may continuously increase from the based end side towards the leading end side, or may increase step-wise from the base end side toward the leading end side.

The bonding portion 31 is bonded to the surface of the base particle 2 in the coating layer 3 included in the electrophoretic particles 1, and in so doing the first compound 39 is connected to the base particles 1.

The bonding portion 31, in the invention, can form a common bond by the base particle 2 and the hydroxyl group included in the surface thereof being bonded, and is formed by polymerizing a plurality of the second monomer M2 including the functional group, and a plurality of bonding units (constituent unit) derived from the monomer M2 are connected.

In this way, by using the first compound 39 including a plurality of bonding portions 31 each including the functional group, it is possible for the dispersibility of the electrophoretic particles 1 to be made superior. That is, the first compound 39 not only includes a plurality of functional groups, but the plurality of functional groups are present concentrated at the bonding portion 31. Furthermore, because the bonding portion 31 is connected to a plurality of bonding units, the site capable of reacting with the base particles 2 is large compared to a case where there is only one bonding unit. Therefore, it is possible for the first compound 39 to be reliably bonded to the surface of the base particle 2 at the bonding portion 31 formed by polymerizing the plurality of monomers M2.

In the embodiment, the hydroxyl group is included in the surface of the base particle 2, and the functional group included in the monomer M2 becomes an alkoxysilyl group, as described above. By making the combination of such a hydroxyl group and an alkoxysilyl group, since the reaction between the groups indicates superior reactivity, it is possible for the bond to the surface of the base particle 2 to be more reliably formed at the bonding portion 31.

The monomer M2 includes one alkoxysilyl group represented by the following general formula (II) as the functional group, and further includes one polymerizable group so as to be able to be polymerized by live radical polymerization.

[in the formula, each R independently represents an alkyl group having 1 to 4 carbon atoms, and n represents an integer of 1 to 3.]

By using such a configuration as the monomer M2, it is possible to create the bonding portion 31 at which the monomer M2 is polymerized by live radical polymerization, and further the bonding portion 31 formed by live radical polymerization exhibits superior reactivity to the hydroxyl group positioned in the surface of the base particles 2.

Examples of the one polymerizable group included in the monomer M2 include those that include a carbon-carbon double bond, such as a vinyl group, a styryl group, and a (meth)acryloyl group, similarly to the monomer M1.

Examples of the monomer M2 include vinyl monomers including one alkoxysilyl group represented by the above general formula (II), vinyl ester monomers, vinyl amide monomers, (meth)acrylic monomers, (meth) acrylic ester monomers, (meth) acrylic amide monomers, and styryl monomers, and more specifically include silane-based monomers containing silicon atoms such as 3-(meth) acryloxypropyltriethoxy(methoxy) silane, vinyl triethoxy (methoxy) silane, 4-vinyl butyl triethoxy (methoxy) silane, 8-vinyl octyltriethoxy (methoxy) silane, 10-methacryloyloxydecyl triethoxy (methoxy) silane and 10-acryloyloxydecyl triethoxysilane (methoxy) silane, and it is possible to use one type or a combination of two or more types thereof.

In one polymer, it is preferable that the number of bonding units included in the bonding portion 31 be 1 or more to 10 or less, 2 or more to 10 or less is more preferable, and 3 or more to 6 or less is still more preferable. Because the bonding portion 31 has a low affinity to the dispersion medium compared to the dispersion portion 32 when the upper limit value is exceeded, there is concern of the dispersibility of the electrophoretic particles 1 being lowered and of the bonding portions 31 locally bonding with each other according to the type of monomer M2. When lower than the lower limit value, it is difficult for bonding with the base particles 2 to proceed sufficiently according to the type of monomer M2, and there is concern of the dispersibility of the electrophoretic particles 1 being lowered caused by this difficulty.

It is possible for the number of bonding units included in the bonding portion 31 to be obtained by analysis using a general-purpose analyzer, such as NMR spectrum, IR spectrum, element analysis, gel permeation chromatography (GPC) or the like. Because the bonding portion 31 and the dispersion portion 32 are macromolecular polymers in the first compound 39, both have a molecular weight distribution. Accordingly, although the results of the analysis as outlined above are not limited to corresponding to all of the first compound 39, it is possible for the reactivity between the first compound 39 and the base particles 2 and the dispersibility of the electrophoretic particles 1 to both be achieved as long as the number of bonding units obtained with at least the above methods is 1 to 8.

The first compound 39 is a diblock copolymer in which bonding portion 31 and the dispersion portion 32 are each separately provided. Therefore, because it is possible for the bondability to the base particles 2 and the dispersibility of the electrophoretic particles 1 to each be independently imparted on the first compound 39, the electrophoretic particles 1 exhibit superior dispersibility.

The first compound 39 is obtained by a manufacturing method which is described later. When reversible addition-fragmentation chain-transfer polymerization (RAFT), described later, is used, it is possible to obtain a comparatively uniform polymer. Accordingly, if polymerization is performed by adding 1 to 8 mol equivalent of the monomer M2 with respect to the chain transfer agent, it is possible for the number of bonding units in the bonding portion 31 to be set to the above range. Accordingly, it is possible for the effects due to the electrophoretic particles 1 having a configuration including the first compound 39 to be reliably exhibited, the electrophoretic particles 1 have superior dispersibility in the electrophoresis dispersion liquid.

It is preferable for the addition amount of the first compound 39 in the electrophoretic particles 1 to the base particles 2 to be 1.0 wt % or more to 6.0 wt % or less, and 2.0 wt % or more to 3.0 wt % or less is more preferable.

Accordingly, it is possible for the dispersibility of the electrophoretic particles 1 in the electrophoresis dispersion liquid to be made superior.

As described above, in the embodiment, the second compound 37 is a silane coupling agent that includes a non-polar group and a second functional group.

The second compound 37 has a lower molecular weight than the first compound 39, and is connected to the base particle 2 at the second functional group by reacting the first functional group and the second functional group.

The second compound 37 includes a non-polar group. Accordingly, it is possible to accurately suppress or prevent aggregation of the electrophoretic particles 1 by the repulsive force between the electrophoretic particles 1 arising due to each electrophoretic particle 1 being provided with the second compound 37, without exerting an adverse influence on the dispersibility and the charging properties (charging amount) of the electrophoretic particles 1. For the aggregation between electrophoretic particles 1, it is possible to more accurately suppress aggregation between white particles 95$a$ and colored particles 95$b$ having reverse charges by the electrophoretic particles 1 being applied to white particles 95$a$ having negative chargeability (negative charge) and colored particles 95$b$ having positive chargeability (positive charge) as in the electrophoresis display device 920, described later. That is, the second compound 37 is connected to the surface of the base particle 2 in the electrophoretic particle 1 in order for aggregation between the electrophoretic particles 1 in the electrophoresis dispersion liquid.

Below, each portion (non-polar group and second functional group) in the silane coupling agent having a non-polar group and a second functional group that is the second compound 37 in the embodiment will be described.

The non-polar group is provided in the surface of the base particles 2 in the coating layer 3 in order to suppress or prevent aggregation between electrophoretic particles 1 in the electrophoresis dispersion liquid, described later.

The non-polar group is not particularly limited as long as it shows non-polarity, and examples thereof include hydrocarbon groups. Because hydrocarbon groups exhibit superior non-polarity, it is possible to more precisely suppress or prevent aggregation between the electrophoretic particles 1.

Examples of the non-polar group include alkyl groups, aryl groups, cycloalkyl groups, phenyl groups, alkenyl groups, aralkyl groups, cycloalkenyl groups, alkynyl groups, aryl ether groups, silyl groups, siloxanyl groups, and alkoxy groups, and, although it is possible to use one type or a combination of two or more types thereof, among these, an alkyl group that is one type of hydrocarbon group is particularly preferable. Because the non-polar group (hydrocarbon group) has a structure that is particularly difficult to charge, it is possible for the effects to be more remarkably exhibited.

The hydrocarbon group preferably contains 1 to 20 carbon atoms, and more preferably 1 to 10 carbon atoms. In so doing, it is possible for the second compound 37 to be more reliably connected to the region between the first compounds 39 connected to the base particles 2 while exhibiting a function as a non-polar group.

Although the non-polar group may form any of a straight chain shape, a branched shape, or a ring shape, a straight chain shape is preferable. Accordingly, the steric hindrance of the non-polar group is reduced and the second compound 37 can be reliably interposed in a region between the first compounds 39 connected to the base particles 2.

In the embodiment, as described above, the second functional group, is an alkoxysilyl group, and the first functional group included in the base particles 2 is a hydroxyl group.

By making the combination of such a hydroxyl group and an alkoxysilyl group, since the reaction between the groups indicates superior reactivity, it is possible for the bond of the second compound 37 to the surface of the base particle 2 to be more reliably formed at the second functional group.

Examples of the second compound 37 that includes the second functional group include silane coupling agents represented by the following general formula (III) when the non-polar group is D.

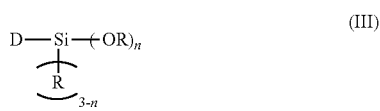

[in the formula, D represents a non-polar group, each R independently represents an alkyl group having 1 to 4 carbon atoms, and n represents an integer of 1 to 3]

By using the second compound 37 having this structure, the second compound 37 exhibits superior reactivity to the hydroxyl group positioned in the surface of the base particles 2.

Although the second compound 37 may have the non-polar group D directly connected to the silicon atom as represented by the general formula (III), an interposed matter such as a siloxane skeleton may be interposed between the silicon atom and the non-polar group.

It is preferable that the molecular weight of the second compound 37 be 100 or more to 1,000 or less, and 100 or more to 500 or less is more preferable. Accordingly, the steric hindrance of the second compound 37 is reduced and the second compound 37 can be more reliably interposed in a region between the first compound 39 and the third compound 35 connected to the base particle 2. As a result, it is possible for the dispersibility of the electrophoretic particles 1 in the electrophoresis dispersion liquid to be made superior.

When the weight average molecular weight of the dispersion portion 32 is A and the molecular weight of the second compound 37 is B, it is preferable that A/B be 10 or more to 1,000 or less, and 50 or more to 500 or less is more preferable. Accordingly, it is possible for the effects to be more remarkably exhibited.

It is preferable for the addition amount of the second compound 37 in the electrophoretic particles 1 to the base particles 2 to be 0.1 wt % or more to 2.0 wt % or less, and 0.3 wt % or more to 1.0 wt % or less is more preferable. Accordingly, it is possible for the effects to be more remarkably exhibited.

As described above, the third compound 35 in the embodiment is a silane coupling agent that includes a charging group and a second functional group.

The third compound 35 has a lower molecular weight than the first compound 39, and is connected to the base particle 2 at the second functional group by reacting the first functional group and the second functional group.

The third compound 35 is a compound including a charging group. Accordingly, by setting, as appropriate, the type of the charging group and further, the number of third compounds 35 connected to the base particle 2, it is possible to make the positive and negative chargeability of the electrophoretic particles 1, and further the charging amount of the electrophoretic particles 1 desirable. That is, the third compound 35 is connected to the surface of the base particle 2 in order to set the positive and negative chargeability of the electrophoretic particles 1, and the charging amount thereof to be desirable in the electrophoresis dispersion liquid.

Below, each portion (charging group and second functional group) that forms the silane coupling agent having a charging group and a second functional group that is the third compound 35 in the embodiment will be described.

The charging group is provided on the surface of the base particle 2 in the coating layer 3 in order to set the positive and negative chargeability of the electrophoretic particles 1, and the charging amount thereof to be desirable in the electrophoresis dispersion liquid.

Although not particularly limited, as long as the charging group expresses positive or negative chargeability, examples thereof include polarization groups or ionic groups. Accordingly, it is possible for the third compound 35 to reliably provide positive or negative chargeability.

The polarization group from the charging group is an organic group having a main skeleton, and a substituent bonded to the main skeleton. In the polarization group, by setting at least one condition of the type of substituent (either or both of an electron absorbing group and an electron donating group), number of bonds with respect to the main skeleton, and the bonding position, the electrons in the main skeleton are biased (polarized), and thereby, the charge state of the third compound 35 is controlled.

That is, on the end portion (below, referred to "terminal of the main skeleton") side of the opposite side to the second functional group of the main skeleton, the electrons are biased further toward the terminal end side than to the polymerizable group side of the main skeleton in the polarization group in which the electron absorbing group (electron withdrawing group) is bonded as a substituent. When such a polarization group is introduced, the third compound 35 is negatively charged.

Meanwhile, on the second functional group side of the main skeleton, the electrons are biased further to the second functional group side than the terminal side of the main skeleton in the polarization group in which the electron withdrawing group is bonded as a substituent. When such a polarization group is introduced, the third compound 35 is positively charged.

In the polarization group to which an electron donating group (electron donor group) is bonded as a substituent, because an opposite bias in the electron concentration to the above-described arises, when the polarization group in which the electron donor group is bonded to the terminal side of the main skeleton is introduced, the third compound 35 is positively charged, and when the polarization group in which the electron donor group is bonded to the second functional group side of the main skeleton, the third compound 35 are negatively charged.

The bias in the electron concentration exhibits a tendency to increasing as the number of bonds of the substituent bonded to the main skeleton increases.

It is possible to control (adjust) the third compound 35 to a desired charging state providing the third compound 35 with a polarization group in which bias arises in this electron density.

It is preferable to be in a state in which the bias in electron concentration easily arises in the main skeleton of the polarization group. Accordingly, it is preferable that the main skeleton have a portion (structure) in which IC electrons are delocalized. Accordingly, the movement of electrons in the main skeleton easily arises, it is possible for the biasing in the electron density to be more remarkably exhibited.

Although the portions in which the π electrons are delocalized are all preferably in a structure in which the conjugated double bonds are linearly connected, it is preferable to have a ring structure in which at least a part thereof form a ring. Accordingly, the movement of the electrons more easily and smoothly occurs.

Although various types of such a ring structure exist, it is preferable that the ring structure be an aromatic ring, and it is particularly preferable that the ring structure be a benzene ring, a naphthalene ring, a pyridine ring, a pyrrole ring, a thiophene ring, an anthracene ring, a pyrene ring, a perylene ring, a pentacene ring, a tetracene ring, a chrysene ring, an azulene ring, a fluorene ring, a triphenelene ring, a phenanthrene ring, a quinoline ring, an indole ring, a pyrazine ring, an acridine ring, a carbazole ring, a furan ring, a pyran ring, a pyrimidine ring, or a pyridazine ring. Accordingly, bias (polarization) in the electron concentration in the ring structure easily arises, and, as a result, it is possible for the bias in the electron concentration to be made more remarkable.

It is preferable that the main skeleton further have the ring structure at the terminal thereof, and that the substituent be bonded to the ring structure.

Accordingly, bias (polarization) in the electron concentration in the ring structure easily arises, and, as a result, it is possible for the bias in the electron concentration to be made more remarkable.

It is preferable that the substituent in the third compound 35 be an electron withdrawing group or an electron donor group.

Accordingly, it is possible for the third compound 35 to reliably provide positive or negative chargeability.

Here, a case of the main skeleton having a benzene ring at the terminal thereof is described as an example.

In this case, when the electron absorbing group T as the substituent is bonded to at least the three third to fifth positions (all of the second to sixth positions in the following chemical formula (a)) from the second to sixth positions of the I: benzene ring, as illustrated in the following chemical formula (a), the electrons in the main skeleton are drawn to the terminal side by the presence of the electron absorbing group T, and biased. Therefore, the third compound 35 is negatively charged.

When the electron absorbing group T as the substituent is bonded to at least one position (in the following chemical formula (b), third and fourth positions) of the third, fourth, and fifth positions of the II: benzene ring, as illustrated in the following chemical formula (b), the electrons in the main skeleton (in particular, on the benzene ring) are drawn to the terminal side by the presence of the electron absorbing group T, and biased. Therefore, the third compound 35 is negatively charged.

When the electron absorbing group T as the substituent is bonded to at least one position (in the following chemical formula (c), second and sixth positions) of the second and sixth positions of the III: benzene ring, as illustrated in the following chemical formula (c), the electrons in the main skeleton (in particular, on the benzene ring) are drawn to the polymerizable group side by the presence of the electron absorbing group T, and biased. Therefore, the third compound 35 is positively charged.

When the electron donating group G as the substituent is bonded to at least the three third to fifth positions (in the following chemical formula (d), four positions of second to fifth positions) from the second to sixth positions of the IV: benzene ring, as illustrated in the following chemical formula (d), the electrons in the main skeleton are drawn to polymerizable group side by the presence of the electron donating group G, ad biased. Therefore, the third compound 35 is positively charged.

When the electron donating group G as the substituent is bonded to at least one position (in the following chemical formula (e), fourth position) from the third, fourth, and fifth positions of the V: benzene ring, as illustrated in the following chemical formula (e), the electrons in the main skeleton (in particular, on the benzene ring) are drawn to the polymerizable group side by the presence of the electron donating group G, and biased. Therefore, the third compound 35 is positively charged.

When the electron donating group G as the substituent is bonded to at least one position (in chemical formula (f), second position) from the second and sixth positions of the VI: benzene ring, as illustrated in the following chemical formula (f), the electrons in the main skeleton (in particular, on the benzene ring) are drawn to the terminal side by the presence of the electron donating group G, and biased. Therefore, the third compound 35 is negatively charged.

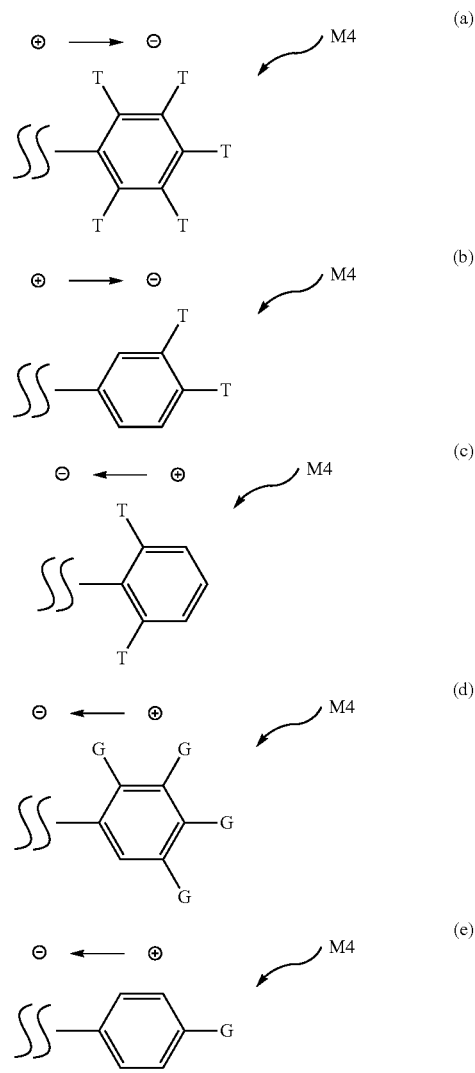

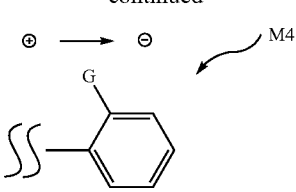

It should be noted that the II structure and VI structure, and the III structure and V structure, may be combined, respectively. Accordingly, it is possible for the bias in the electron concentration in the main skeleton (in particular, on the benzene ring) to be still more remarkable.

The main skeleton may be formed of only one ring structure described above, or may be a structure in which a plurality of ring structures are bonded in a straight chain. Specific examples of the latter main skeleton include the following formulae (A-1) to (A-3)

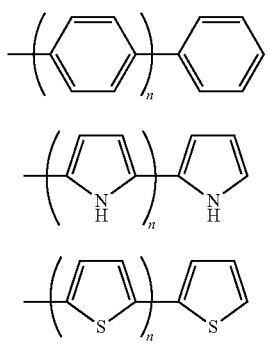

wherein, in formulae (A-1) to (A-3), n in the formula indicates an integer of 1 or more.

In the main skeleton represented by the formulae (A-1) to (A-3), although it is preferable that the substituent be bonded to the ring structure of the terminal, the substituent may be bonded to another ring structure other than the terminal.

The electron absorbing group T is not particularly limited if it is a substituent that exhibits a tendency to be more strongly drawn (withdrawn) than hydrogen atoms, and examples thereof include halogen atoms, such as F, Cl, Br and I, a cyano group, a nitro group, a carboxyl group, a trifluoromethyl group, a formyl group, and a sulfo group. Among these, it is preferable that the electron absorbing group be at least one type selected from a group formed from a halogen atom, a cyano group, a nitro group, a carboxyl group, and a trifluoromethyl group. These have a particularly high capacity for drawing electrons.

Meanwhile, the electron donating group G is not particularly limited if it is a substituent that exhibits a tendency toward strongly expelling (donating) electrons compared to hydrogen atoms, and examples thereof include an amino group, an alkyl group, an alkoxy group, and a hydroxyl group. Among these, the electron donating group is at least one type selected from a group formed from an amino group, an alkyl group, and an alkoxy group. These have a particularly high capacity for expelling electrons.

The alkyl group preferably has 1 to 30 carbon atoms, and more preferably 1 to 18 carbon atoms. The alkoxy group preferably has 1 to 30 carbon atoms, and more preferably 1 to 18 carbon atoms. When the number of carbon atoms is excessively high in the alkyl group and the alkoxy group, either one of the alkyl group and the alkoxy group exhibits a tendency to easily aggregate to themselves, and, as a result, there is concern of difficulty in adjusting the charging state of the third compound 35 to a desired state.

It is preferable that the total number of carbon atoms in the main skeleton be 6 to 40, and 6 to 35 is more preferable. When the total number of carbon atoms is excessively low, the atoms do not easily become delocalized, and there is concern that it may therefore be difficult for bias in the electrons to effectively arise, whereas, when the total number of carbon atoms is too high, there is concern of it being difficult to introduce the third compound 35 to the surface of the base particles 2.

Examples of ionic group include those provided with a basic group, such as an amino group, and thereby imparting positive chargeability to the third compound 35 by exhibiting positive ionicity, and those provided with an acidic group, such as a carboxy group, and thereby imparting negative chargeability to the third compound 35 by exhibiting negative ionicity. Among these, those provided with an acidic group and further having a configuration provided with a cyclic structure which forms an acidic group and a salt are preferably used.

By using a group which has a cyclic structure, in which the cyclic structure forms an acidic group and a salt as the ionic group, it is possible for the third compound 35 to have superior solubility and to be dissolved in the solvent when preparing the electrophoretic particles, described later. A portion of the cyclic structure is dissociated from the acidic group in the electrophoresis dispersion liquid, and it is possible for the electrophoretic particles 1 to have superior dispersibility caused thereby and to be dispersed in the electrophoresis dispersion liquid. Accordingly, below, a configuration provided with an acidic group and a cyclic structure which forms an acidic group and a salt as the ionic group will be described.

Examples of the acidic group include a sulfonate group, a phosphoric acid group, and an alkoxy group in addition to the carboxy group, and although it is possible to use one type or a combination of two or more types thereof, among these, a carboxy group, a phosphoric acid group and a sulfonate group are preferable. Accordingly, it is possible to reliably form a salt between within the cyclic structure.

The cyclic structure (ionophore) forms an acidic group having a monofunctional monomer component and a salt in a state that captures an alkali metals such as Na and K and metal ions such as alkaline earth metals, such as Mg, and Ca. By the cyclic structure forming an acidic group and a salt, it is possible for the dispersibility of the third compound 35 to be further improved during manufacturing of the electrophoretic particles 1, and to reliably negatively charge the third compound 35 in the electrophoresis dispersion liquid.

Although preferable examples of the ionophore (cyclic structure) those including at least one of an oxygen atom, a nitrogen atom, and a sulfur atom (that is, the methylene groups are bonded to one another with the oxygen atom, the nitrogen atom, or the sulfur atom), and those formed only of methylene groups (hydrocarbon rings), and, in particular, those in which the methylene groups are connected to one another with the oxygen atom, the nitrogen atom, or the sulfur atom (heteroatom) are preferable. Such an ionophore is preferable since the structure thereof has an extremely high capturing capacity of capturing the metal ions. There are advantages in that the size of the ring (inside space) and softness of the ring are easily adjusted, and that it is possible to comparatively easily to perform the synthesis of the ionophore.

Examples of an ionophore including such a heteroatom include crown ether-based, aza crown-based, cryptand-based, sulfide-based (thioether-based), and propylene glycol-based ionophores.

Examples of the crown ether-based ionophore include 12-crown-4-ether, 2-hexyl-12-crown-4-ether, 2-octyl-12-crown-4-ether, 2-decyl-12-crown-4-ether, 2-dodecyl-12-crown-4-ether, 2-tetradecyl-12-crown-4-ether, 15-crown-5-ether, 2-butyl-15-crown-5-ether, 2-hexyl-15-crown-5-ether, 2-dodecyl-15-crown-5-ether, 2-tetradecyl-15-crown-5-ether, 18-crown-6 ether, 2-hexyl-18-crown-6 ether, 2-octyl-18-crown-6 ether, 2-tetradecyl-18-crown-6 ether, 2,3-dioctyl-18-crown-6 ether, 21-crown-7-ether, 2-decyl-21-crown-7-ether, 24-crown-8-ether, 2-decyl-24-crown-8-ether, and 2-dodecyl-24-crown-8-ether.

Examples of the aza crown-based ionophore include 1,4,7-tripropyl-1,4,7-triazacyclononane, 2-decyl-1,4,7-tripropyl-1,4,7-triazacyclononane, 1,4,7-tributyl-1,4,7-triazacyclononane, 1,4,7,10-tetraoctyl-1,4,7,10-tetraazacyclododecane, 1,4,7,10-tetra(decyl)-1,4,7,10-tetraazacyclododecane, 1,4,7,10-tetra(dodecyl)-1,4,7,10-tetraazacyclododecane, 1,4,7,10-tetra(hexadecyl)-1,4,7,10-tetraazacyclododecane, 1,4,7,10,13-pentaoctyl-1,4,7,10,13-pentaaza cyclopentadecane, 1,4,7,10,13-penta(decyl)-1,4,7,10,13-pentaaza cyclopentadecane, 1,4,7,10,13,16-hexa(decyl)-1,4,7,10,13,16-hexa azacyclo octadecane, 1,4,7,10,13,16-hexa(tetradecyl)-1,4,7,10,13,16-hexa azacyclo octadecane, and 1,4,7,10,13,16-hexa(hexadecyl)-1,4,7,10,13,16-hexa aza cycloocta decane.

Examples of the cryptand-based ionophore include 4,10,15-trioxa-1,7-diazabicyclo[5.5.5] heptadecane, 3-tetradecyl-4,10,15-trioxa-1,7-diazabicyclo[5.5.5] heptadecane, 4,7,13,18-tetraoxa-1,10-diazabicyclo[8.5.5] eicosane, 5-decyl-4,7,13,16,21-pentaoxa-1,10-diazabicyclo[8.8.5] tricosane, 4,7,13,16,21,24-hexaoxa-1,10-diazabicyclo[8.8.8] hexacosane, 5-tetradecyl-4,7,13,16,21,24-hexaoxa-1,10-diazabicyclo [8.8.8] hexacosane, and 4,7,10,16,19,24,27-heptaoxa-1,13-diazabicyclo[11.8.8] nonacosane.

In the embodiment, as described above, the second functional group is an alkoxysilyl group, and the first functional group included in the base particles 2 is a hydroxyl group.

By making the combination of such a hydroxyl group and an alkoxysilyl group, since the reaction between the groups indicates superior reactivity, it is possible for the bond of the third compound 35 to the surface of the base particle 2 to be more reliably formed at the second functional group.

Examples of the third compound 35 that includes the second functional group include silane coupling agents represented by the following general formula (IV) when the charging group is E.

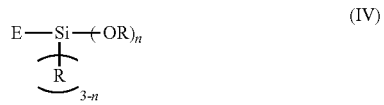

(IV)

[in the formula, E represents a charging group, each R independently represents an alkyl group having 1 to 4 carbon atoms, and n represents an integer of 1 to 3]

By using the third compound 35 having this structure, the third compound 35 exhibits superior reactivity to the hydroxyl group positioned in the surface of the base particles 2.

Although the third compound 35 may be a compound with the charging group E directly connected to the silicon atom, as illustrated in general formula (IV), the compound may have an intermediate such as a siloxane skeleton interposed between the silicon atom and the charging group, or may have a non-polar group described by the second compound 37 interposed between the silicon atom and the charging group.

It is preferable that the molecular weight of the third compound 35 be 100 or more to 1,000 or less, and 100 or more to 500 or less is more preferable. Accordingly, the steric hindrance of the third compound 35 is reduced and the third compound 35 can be more reliably interposed in a region between the first compound 39 and the second compound 37 connected to the base particle 2. As a result, it is possible to more reliably set the charging amount of the electrophoretic particles 1 to a suitable range.

When the weight average molecular weight of the dispersion portion 32 is A and the molecular weight of the third compound 35 is C, it is preferable that A/C be 10 or more to 1,000 or less, and 50 or more to 500 or less is more preferable. Accordingly, it is possible for the effects to be more remarkably exhibited.

It is preferable for the addition amount of the third compound 35 in the electrophoretic particles 1 to the base particles 2 to be 0.1 wt % or more to 2.0 wt % or less, and 0.3 wt % or more to 1.0 wt % or less is more preferable. Accordingly, it is possible for the effects to be more remarkably exhibited.

The base particle 2 included in the electrophoretic particles 1 have positive chargeability or negative chargeability, and further, charging amount individual to the base particle 2 according to the type of selected particle, that is, the type of pigment particle, resin particle, composite particle or the like. Therefore, when a portion of the base particle is exposed without the portion being covered by the coating layer in the electrophoretic particles, the positive and negative chargeability and the charging amount derived from the base particle exert an influence on the positive and negative chargeability and the charging amount of the electrophoretic particles. Accordingly, it is necessary to consider the positive and negative chargeability and the charging amount derived from the base particle in the electrophoretic particles even if control of the positive and negative chargeability and the charging amount of the electrophoretic particles 1 is attempted by adjusting the bonding amount (adsorption amount) with respect to the base particle of the third compound provided with positive and negative chargeability and a charging amount. More specifically, the particles have individual positive and negative chargeability and charging amounts as above according to the type of base particles, and the positive and negative chargeability and charging amount derived from the base particle exposed in the electrophoretic particles differ according to the type of base particle. Therefore, the third compound connected to the base particle has a problem in that it is necessary to set, as appropriate, the bonding amount thereof according to the type of base particle selected, and time and effort are necessary.

In contrast, in the invention, the first compound 39, second compound 37, and third compound 35 are connected to the surface of the base particle 2, and accordingly, substantially the entire surface of the base particle 2 is covered and the surface of the base particle 2 being exposed is accurately suppressed. More specifically, the bonding amounts of the first compound 39 which contributes dispersibility and the third compound 35 which contributes chargeability are set according to the dispersibility and the charging amount each is to impart to the electrophoretic particles 1, and the first compound 39 and the third compound 35 are connected to the surface of the base particles 2. The second compound 37 which does not contribute dispersibility and chargeability is connected to be embedded in the surface of the base particle 2 exposed by the connection with the first compound 39 and the third compound 35, and, accordingly, substantially the entire surface of the base particle 2 is covered by the coating layer 3. As above, because the surface of the base particle 2 being exposed is effectively reduced in the electrophoretic particles 1, the contribution of the positive and negative chargeability and the charging amount of the base particle 2 to the positive and negative chargeability and the charging amount of the electrophoretic particles 1 is accurately suppressed or prevented. In this case, the positive and negative chargeability and the charging amount included by the third compound is contributed with priority. Accordingly, the positive and negative chargeability and the charging amount of the electrophoretic particles 1 can be controlled by adjusting the type and bonding amount of the third compound 35 connected to the base particle 2, and simplification of the time and effort when manufacturing the electrophoretic particles 1 is achieved.

Accordingly, because aggregation between the electrophoretic particles 1 in the electrophoresis dispersion liquid is suppressed for the electrophoretic particles 1, as described above, the second compound 37 is connected to the surface of the base particle 2, and exhibits a function as a covering portion which effectively suppresses or prevents the surface of the base particle 2 being unnecessarily exposed and an adverse influence being exerted on the positive and negative chargeability and the charging amount of the electrophoretic particles 1.

In light of the above, the electrophoretic particles 1 exhibit superior dispersibility, have the charging amount thereof set to a suitable range and have superior electrophoretic properties in the electrophoresis dispersion liquid by means of the first compound 39, the second compound 37, and the third compound 35 being connected to the base particles 2.

As outlined above, it is possible for the electrophoretic particles 1 of the embodiment in which the first compound 39, the second compound 37, and the third compound 35 are connected to the surface of the base particles 2 to be manufactured as follows applying the method of manufacturing the electrophoretic particles of the invention.

Method of Manufacturing Electrophoretic Particle

The method of manufacturing the electrophoretic particles 1 includes a step of connecting a plurality of the third compounds 35 to the base particle 2 by the first functional group included in the base particles 2 and the second functional group included in the third compound 35 being reacted, a step of obtaining the first compound 39 in which the bonding portion 31 and the dispersion portion 32 are connected using the monomer M1 and the monomer M2 by living polymerization, a step of connecting the plurality of first compounds 39 to the base particles 2 by the first functional group included in the base particles 2 and the second functional group included in the bonding portion 31 being reacted, and a step of connecting the plurality of the second compounds 37 to the base particle 2, thereby forming the coating layer 3 by means of the first functional group included in the base particles 2 and the second functional group included in the second compound 37 being reacted.

In the step of obtaining the first compound 39, although 1) the bonding portion 31 in which the second monomer M2 having the second functional group is polymerized may be formed after the dispersion portion 32 in which the first monomer M1 is polymerized may be formed by living radical polymerization using a polymerization initiator, or 2) the bonding portion 31 and the dispersion portion 32 may be formed in this order, here, a case were the plurality of first compounds 39 is formed with the method in 1) will be described.

Below, each step will be described in detail.

[1] First, the plurality of third compound 35 is connected to the base particles 2 by the first functional group included in the base particles 2 and the second functional group included in third compound 35 reacted and a chemical bond being formed therebetween (first step).

Examples of the process by which the third compound 35 is connected to the base particle 2 include a dry method and a wet method illustrated below.

Dry Method

In the dry method, first, a solution is prepared by mixing the third compound 35 and the base particles 2 in a suitable solvent. Minute amounts of water, an acid or a base may be added to the solution, as necessary, in order to promote the hydrolysis of the alkoxysilyl group included in the third compound 35. Heating, light radiation or the like may be performed, as necessary.

At this time, it is preferable that the volume of the solvent be approximately 1 vol % or more to the volume of the base particles 2 to approximately 20 vol % or less, and approximately 5 vol % or more to approximately 10 vol % or less is more preferable. Accordingly, because it is possible for the chance of the third compound 35 contacting the base particle 2 to be increased, it is possible for the bonding portion 31 to be more reliably bonded to the surface of the base particles 2.

Next, after the third compound 35 is highly efficiently adsorbed to the surface of the base particles 2 by dispersing with ultrasound wave radiation or stirring using a ball mill or a bead mill, or the like, the solvent is removed.

Next, a chemical bond with the hydroxyl group exposed in the surface of the base particles 2 is formed by decomposing the alkoxysilyl group while heating the powder obtained by removing the solvent in preferable conditions of 100° C. to 200° C. for an hour or more.

Next, the excess first compound 39 adsorbed to the surface of the base particles 2 without forming a chemical bond is removed by cleaning again several times in the solution while using a centrifuge.

It is possible for the third compound 35 to be connected to the base particles 2 by passing through the above steps.

Wet Method

In the wet method, first, a solution is prepared by mixing the third compound 35 and the base particles 2 in a suitable solvent. Minute amounts of water, an acid or a base may be added to the solution, as necessary, in order to promote the hydrolysis of the alkoxysilyl group included in the third compound 35. Heating, light radiation or the like may be performed, as necessary.

At this time, it is preferable that the volume of the solvent be approximately 1 vol % or more to the volume of the base particles 2 to approximately 20 vol % or less, and approximately 5 vol % or more to approximately 10 vol % or less is more preferable. Accordingly, because it is possible for the chance of the third compound 35 contacting the base particle 2 to be increased, it is possible for the bonding portion 31 to be more reliably bonded to the surface of the base particles 2.

Next, after the third compound 35 is highly efficiently adsorbed to the surface of the base particles 2 by dispersing with ultrasound wave radiation or stirring using a ball mill or a bead mill, or the like, it is possible for the third compound 35 to be connected to the base particles 2 by a chemical bond with the hydroxyl group exposed in the surface of the base particles 2 being formed by decomposing the alkoxysilyl group while heating the solvent in this state in preferable conditions of 100° C. to 200° C. for one hour or more.

Next, the excess first compound 39 adsorbed to the surface of the base particles 2 without forming a chemical bond is removed by cleaning again several times in the solution while using a centrifuge.

In either of the wet method and the dry method, the content of the third compound 35 in the solvent which contains the adjusted third compound 35 and base particles 2 is set, as appropriate, in response to the positive and negative chargeability and the charging amount imparted to the electrophoretic particles 1 to be obtained, and the adsorption rate of the third compound 35 to the base particle 2 (equilibrium constant of the reaction between the base particle 2 and the third compound 35).

It is possible to prepare the second compound 37 using various known methods.

[2] Next, a plurality of the first compound 39 in which the dispersion portion 32 is connected to the bonding portion 31 is generated (second step).

[2-1] First, the dispersion portion 32 in which the first monomer M1 is polymerized is formed by living polymerization using a polymerization initiator.

Although example of the living polymerization method include living radical polymerization, living cationic polymerization, or living anionic polymerization, and among these, living radical polymerization is preferable. It is possible for a reaction liquid or the like in which the reaction system is generated to be simply used by performing living radical polymerization, and further, it is possible for the monomer M1 to be polymerized with good control of the reaction.

According to the living radical polymerization, it is possible for the molecular weight distribution in the dispersion portion 32 to be easily set to 1.2 or less, and as a result, it is possible for the obtained electrophoretic particles 1 to exhibit a uniform dispersion capacity in the electrophoresis dispersion liquid.

Although examples of the living radical polymerization method include atom transfer radical polymerization (ATRP), nitroxide-mediated radical polymerization (NMP), telluride-mediated polymerization (TERP), and reversible addition-fragmentation chain-transfer polymerization (RAFT), among these, reversible addition-fragmentation chain-transfer polymerization (RAFT) is preferable. According to the reversible addition-fragmentation chain-transfer polymerization (RAFT), it is possible for the polymerization to be caused to proceed simply during polymerization of the monomer M1 without using a metal catalyst and without concern of metal contamination. It is possible for the molecular weight distribution in the dispersion portion 32 to be more easily set to 1.2 or less.

Although not particularly limited, examples of the polymerization initiator (radical polymerization initiator) include azo initiators such as 2,2'-azobis isobutyronitrile (AIBN), 2,2'-azobis (4-methoxy-2,4-dimethyl valeronitrile), 2,2'-azobis (2,4-dimethyl valeronitrile), dimethyl 2,2'-azobis (2-methylpropionate), 1,1'-azobis (cyclohexane-1-carbonitrile), 2,2'-azobis [2-(2-imidazolin-2-yl) propane] dihydrochloride, and 2,2'-azobis [2-(2-imidazolin-2-yl) propane], and persulfate salts such as potassium persulfate, and ammonium persulfate.

In a case of using the reversible addition-fragmentation chain-transfer polymerization (RAFT), a chain transfer agent (RAFT agent) is used in addition to the polymerization initiator. Although not particularly limited, examples of the chain transfer agent include sulfur compounds having a functional group such as dithioester groups, trithiocarbamate groups, xanthate groups, and dithiocarbamate groups.

Specifically, examples of the chain transfer agent include compounds represented by the following chemical formulae (1) to (7), and it is possible to use one type or a combination of two or more types thereof. These compounds are preferably used in light of being comparatively easily obtained and the reaction being easily controlled.

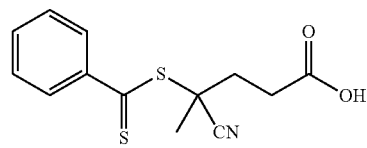

(1)

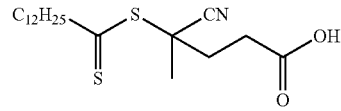

(2)

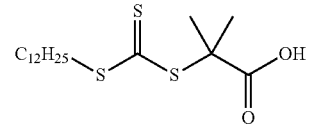

(3)

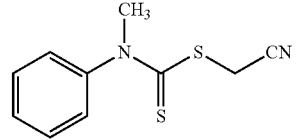

(4)

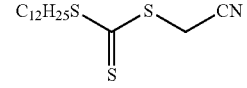

(5)

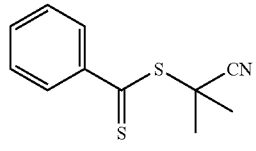

(6)

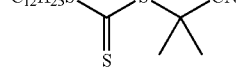

(7)

Among these, it is preferable that the chain transfer agent be a 2-cyano-2-propylbenzathioate represented by the above chemical formula (6). In so doing, it is possible for control of the reaction to be more easily performed.

In a case of using reversible addition-fragmentation chain-transfer polymerization (RAFT), although the ratio of the monomer M1, the polymerization initiator, and the chain transfer agent are determined, as appropriate, in consideration of the polymerization rate of the dispersion portion 32 to be formed or the reactivity of the compound such as the monomer M1, it is preferable that the mol ratio thereof be monomer: polymerization initiator: chain transfer agent=500 to 5:5 to 0.25:1. Accordingly, it is possible to set the length (polymerization rate) of the dispersion portion 32 obtained by polymerizing the monomer M1 to a suitable magnitude, and possible to highly efficiently generate the dispersion portion 32 with the molecular weight distribution easily set to 1.2 or less.

Examples of the solvent for preparing the solution in which the monomer M1 is polymerized by living radical polymerization include water, alcohols such as methanol, ethanol, and butanol, hydrocarbons, such as hexane, octane, benzene, toluene, and xylene, ethers such as diethyl ether, and tretrahydrofuran, and esters such as ethyl acetate, and halogenized aromatic monomer hydrocarbons such as chlorobenzene and o-dichlorobenzene, and it is possible for these to be used independently or as a mixed solvent.

It is preferable that the solution (reaction liquid) is subjected to a deoxidation treatment before initiating the polymerization reaction. Examples of the deoxidation treatment include a conversion or purging treatment after vacuum degassing with an inert gas such as argon gas or nitrogen gas.

It is possible to quickly and reliably perform polymerization reaction of the monomer by heating (temperature increase) the temperature of the solution to a predetermined temperature during the polymerization reaction of the monomer M1.

Although the heating temperature is not particularly limited and differs slightly according to the type and the like of the monomer M1, approximately 30 to 100° C. is preferable. It is preferable that the heating time (reaction time) be approximately 5 to 48 hours in a case where the heating temperature is in the above range.

When using the reversible addition-fragmentation chain-transfer polymerization (RAFT), fragments of the chain transfer agent used are present at one terminal (tip portion) of the dispersion portion 32. In the next step [2-2], the dispersion portion 32 including the fragments acts as a chain transfer agent during the reaction in which the bonding portion 31 is reacted with the dispersion portion 32.

[2-2] Next, the bonding portion 31 at which the second monomer M2 including the second functional group which has reactivity with the first functional group included in the base particles 2 is polymerized is formed so as to be connected to the dispersion portion 32.

Accordingly, the first compound 39 configured by a diblock copolymer in which the dispersion portion 32 and the bonding portion 31 are connected is generated.

In step [2-2], a purification treatment (removal treatment) that removes impurities such as unreacted monomer M1, solvent or polymerization initiator used in the step [2-1], and isolates and purifies the dispersion portion 32 may be performed, as necessary, before forming the bonding portion 31 using the monomer M2. Accordingly, the first compound 39 obtained in the step [2-2] is made more uniform and with a higher purity. The purification treatment is not particularly limited, and examples thereof include a column chromatography method, a recrystalization method, and a re-precipitation method, and it is possible to perform one type or a combination of two or more types thereof.

As described above, when using the reversible addition-fragmentation chain-transfer polymerization (RAFT), fragments of the chain transfer agent used are present at one terminal of the dispersion portion 32. Therefore, the bonding portion 31 with this configuration is formed by preparing the solution containing the dispersion portion 32 obtained with the step [2-1] completed, the monomer M2, and the polymerization initiator, and again performing living polymerization initiator in the solution.

It is possible for the same solvents exemplified in the step [2-1] to be used as the solvent used in this step, and it is possible for the conditions when the monomer M2 is polymerized in the solution to be the same as the those exemplified as the conditions when the monomer M1 is polymerized in the solution in the step [2-1].

[3] Next, the plurality of first compounds 39 is connected to the base particles 2 by the first functional group remaining on the base particles 2 to which the plurality of third compounds 35 is connected and the plurality of second functional groups included in the bonding portion 31 being reacted and a chemical bond being formed therebetween (third step).

The same processes by which the third compound 35 is connected to the base particles 2 are used as the processes in which the first compound 39 is connected to the base particles 2 are used in the dry method and wet method given as examples in step [1].

[4] Next, the plurality of second compounds 37 is connected to the base particles 2 by the first functional group remaining on the base particles 2 to which the plurality of first compounds 39 and third compounds 35 are connected and the second functional group included in the second compound 37 being reacted and a chemical bond being formed therebetween (fourth step).

It is possible to prepare the second compound 37 using various known methods.

Examples of the process by which the second compound 37 is connected to the base particle 2 include a dry method and a wet method in the step [1] similarly to the process by which the third compound 35 is connected to the base particle 2.

Accordingly, electrophoretic particles 1 in which substantially the entire base particle 2 is coated with the coating layer 3 are obtained.

It is possible to obtain purified electrophoretic particles 1 by passing through the above steps.

It should be noted that although a case was described of obtaining the electrophoretic particle 1 by connecting the third compound 35 to the base particle 2 in the step [1], connecting the first compound 39 to the base particle 2 in the step [3], and connecting the second compound 37 to the base particle 2 in the step [4], it is possible for the order in which the first compound 39, the second compound 37, and the third compound 35 are connected to the base particle 2 to be switched to an arbitrary order. However, by the third compound 35 first being connected to the base particle 2 as in the embodiment, it is possible to more reliably impart the charging amount to the electrophoretic particles 1 as an advantage without errors arising.

There are cases of not being dispersed in the dispersion solvent when the electrophoretic particles 1 are dried according to the type of the monomer M1 included in the first compound 39. In such a case, it is preferable convert the reaction solvent to the dispersion solvent a little at a time (not passing through the drying step) with a solvent conversion method during the cleaning task.

It is possible to use the aliphatic hydrocarbons (liquid paraffin) and the silicone oil, or the like exemplified as the dispersion liquid included in the electrophoresis dispersion liquid, described later, in addition to being able to use the same one exemplified in the step [2-1] as the solvent used in this step.

In the embodiment, a case where the second functional group included in the first compound 39 and the second compound 37 are both an alkoxysilyl group is described; however, the second functional group is selected from various functional groups, as outlined above, as long as they are able to react and connect to the first functional group, in this case, the second functional group included in the first compound 39 and the second functional group included in the second compound 37 may be the same as each other or may be different.

Second Embodiment

Next, the second embodiment of the electrophoretic particles of the invention will be described.

Figure 3:
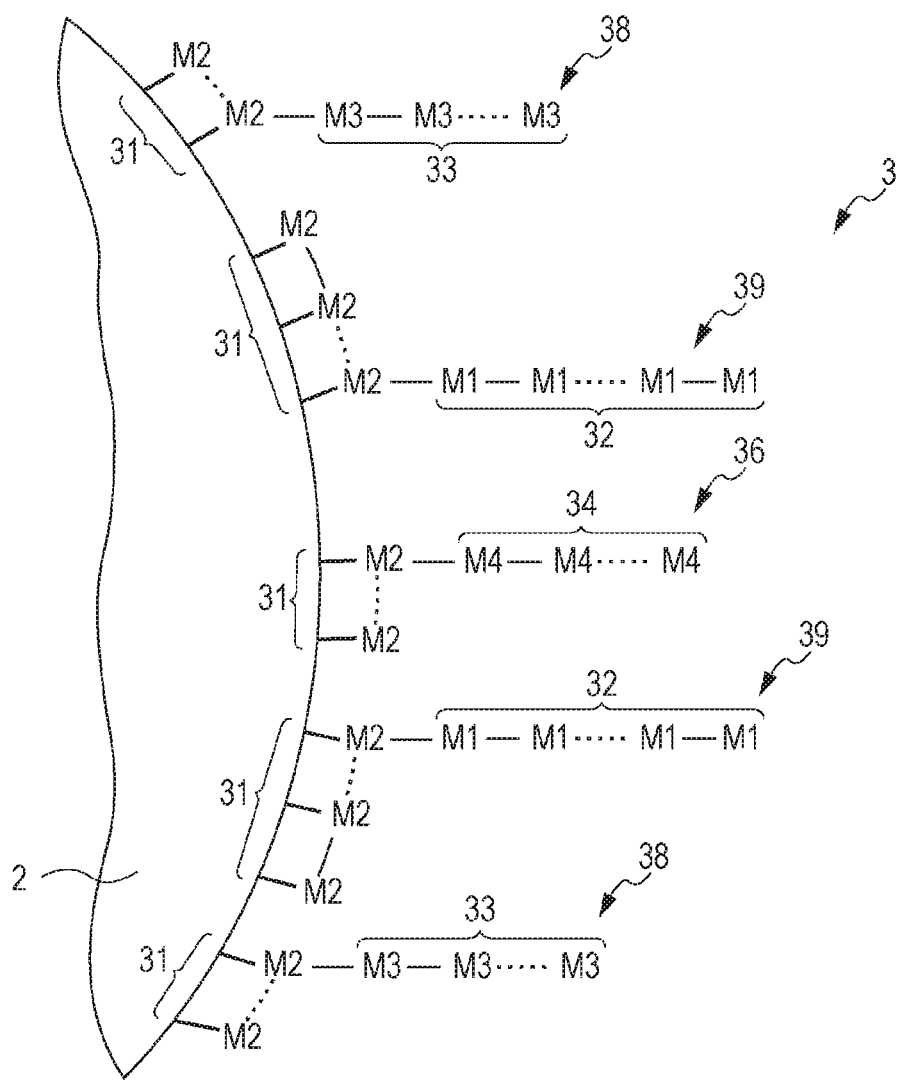
FIG. 3 is a schematic view of a first compound, a second compound, and a third compound included in a second embodiment of the electrophoretic particles of the invention.

FIG. 3 is a schematic view of the first compound, the second compound, and the third compound included in the second embodiment of the electrophoretic particles of the invention.

Below, the electrophoretic particles of the second embodiment will be described centering on the points of difference to the electrophoretic particles 1 of the first embodiment, and similar matters will not be described.

The electrophoretic particles 1 are the same as the electrophoretic particles 1 of the first embodiment shown in FIG. 2 other than the configuration of the second compound and the third compound from the first compound, the second compound, and third compound bonded to the base particles 2 being different, as illustrated in FIG. 3.

That is, in the electrophoretic particles 1 of the second embodiment, the second compound 38 is connected instead of the second compound 37, and the second compound 38 is a block copolymer including the non-polar portion 33 derived from a third monomer M3 including the non-polar group, and a bonding portion 31 derived from the second monomer M2 that includes the second functional group. In the second compound 38 with this configuration, the second compound 38 is connected to the base particles 2 by reacting the first functional group and the second functional group at the bonding portion 31. In the electrophoretic particles 1 of the second embodiment, the third compound 36 is connected instead of the third compound 35, and the third compound 36 is a block copolymer including charging portion 34 derived from a fourth monomer M4 including the charging group, and a bonding portion 31 derived from the second monomer M2 that includes the second functional group. In the third compound 36 with this configuration, the third compound 36 is connected to the base particles 2 by reacting the first functional group and the second functional group at the bonding portion 31.

The non-polar portion 33 included in the second compound 38, similarly to the non-polar group included in the second compound 37 of the first embodiment, is provided on the surface of the base particles 2 in the coating layer 3 in order to suppress or prevent aggregation between the electrophoretic particles 1 in the electrophoresis dispersion liquid, described later.

The non-polar portion 33 is formed by polymerizing a plurality of the monomers M3 having a site at which the non-polar group included in the second compound 37 of the first embodiment becomes a side-chain after polymerization in the electrophoresis dispersion liquid, and a plurality of non-polar units derived from the monomer M3 are connected.

The monomer M3 includes one polymerizable group to be able to be polymerized by live radical polymerization (radical polymerization), and after further polymerization is a pendant-type monofunctional monomer that includes a site that is a non-polar side-chain.

The non-polar portion 33 formed by live radical polymerization reliably exhibits a function of suppressing or preventing aggregation between the electrophoretic particles 1 in the electrophoresis dispersion liquid, described later, by using a monomer including a non-polar side chain as the monomer M3. Therefore, the electrophoretic particles 1 that include the non-polar portion 33 have superior dispersibility and are dispersed in the electrophoresis dispersion liquid without being aggregated.

It is possible to use a monomer including the non-polar group included in the above-described second compound 37 as a side chain, instead of the side chain that contributes to dispersibility included in the above-described monomer M1, as the monomer M3.

Although the bonding portion 31 is bonded to the surface of the base particles 2 in the coating layer 3 included in the electrophoretic particles 1, and thereby, the second compound 38 is connected to the base particles 2, it is possible to use a configuration similar to that of the bonding portion 31 included in the first compound 39 as the bonding portion 31.

The charging portion 34 included in the third compound 36, similarly to the charging group included in the third compound 35 of the first embodiment is provided on the surface of the base particles 2 in the coating layer 3 in order to suppress or prevent aggregation between the electrophoretic particles 1 in the electrophoresis dispersion liquid, described later.

The charging portion 34 is formed by polymerizing a plurality of monomers M4 having a site at which the charging group included in the third compound 35 of the first embodiment becomes a side-chain after polymerization in the electrophoresis dispersion liquid, and a plurality of charging portions derived from the monomer M4 are connected.

The monomer M4 includes one polymerizable group that is able to be polymerized by live radical polymerization (radical polymerization), and after further polymerization is a pendant-type monofunctional monomer that includes a site that is a chargeable side-chain.

The charging portion 34 formed by live radical polymerization reliably exhibits a function of imparting chargeability to the electrophoretic particles 1 in the electrophoresis dispersion liquid, described later, by using a monomer including a chargeable side chain as the monomer M4. Therefore, the electrophoretic particles 1 which include the charging portion 34 in the electrophoresis dispersion liquid are provided with the positive and negative chargeability and charging amount that is an advantage.

It is possible to use a monomer including the charging group included in the above-described third compound 35 as a side chain, instead of the side chain that contributes to dispersibility included in the above-described monomer M1, as the monomer M4.

Although the bonding portion 31 is bonded to the surface of the base particles 2 in the coating layer 3 included in the electrophoretic particles 1, and thereby, the third compound 36 is connected to the base particles 2, it is possible to use the same configuration as that of the bonding portion 31 included in the first compound 39 as the bonding portion 31.

Similar effects to the first embodiment are obtained even by such electrophoretic particles of the second embodiment provided with the second compound 38 formed of a block copolymer having a non-polar portion 33 and a bonding portion 31 and a third compound 36 formed of a block copolymer having a charging portion 34 and a bonding portion 31.

Electrophoresis Dispersion Liquid

Next, the electrophoresis dispersion liquid of the invention will be described.

The electrophoresis dispersion liquid is a liquid in which at least one type of electrophoretic particle (electrophoretic particles of the invention) is dispersed (suspended) in a dispersion medium (liquid phase dispersion medium).

It is preferable that a dispersion medium having a boiling point of 100° C. or more and comparatively high insulation properties be used. Examples of the dispersion medium include various types of water (for example, distilled water, pure water, and the like), alcohols such as butanol and glycerin, cellosolves such as butyl cellosolve, esters such as butyl acetate, ketones such as dibutyl ketones, aliphatic hydrocarbons such as pentane (liquid paraffin), alicyclic hydrocarbons such as cyclohexane, aromatic hydrocarbons such as xylene, halogenated hydrocarbons such as methylene chloride, aromatic heterocycles such as pyridine, nitriles such as acetonitrile, amides such as N,N-dimethyl formamide, carboxylic acid salt, and silicone oil, or various other types of oil, and these may be used independently or as a mixture.

Among these, a dispersion medium having aliphatic hydrocarbons (liquid paraffin), or silicone oil as a main component is preferable. Since the dispersion medium having liquid paraffin or silicone oil as a main component has a high aggregation suppression effect on the electrophoretic particles 1, it is possible suppress deterioration over time of the display performance of the electrophoresis display device 920 shown in FIG. 4. Liquid paraffin or silicone oil has excellent weather resistance because of not having unsaturated bonds, and has the further advantage of high safety.

It is preferable for a dispersion medium with a relative dielectric constant of 1.5 or more to 3 or less to be used, and 1.7 or more to 2.8 or less is more preferable. The dispersion medium has superior dispersibility of the electrophoretic particles 1, and also has excellent electrical insulation properties. Therefore, this contributes to realizing an electrophoresis display device 920 with a reduced power consumption and capable of high contrast display. The value of the dielectric constant is a value measured at 50 Hz, and is a value measured for the dispersion medium for which the contained moisture content at 25° C. is 50 ppm or less.

Various additives such as charge control agents composes of particles, such as an electrolyte, a surfactant (anionic or cationic), a metallic soap, a resin material, a rubber material, a petroleum, a varnish, or a compound, a lubricant, a stabilizer, and various dyes may be added to the dispersion medium as necessary.

Dispersion of the electrophoretic particles in the dispersion medium is possible by performing one or a combination of two or more types from a paint shaker method, a ball mill method, an ultrasound dispersion method or a stirring dispersion method, or the like.

The electrophoretic particles 1 exhibit a superior dispersion capacity through the action of the first compound 39 included in the coating layer 3 in the electrophoresis dispersion liquid.

Electrophoresis Display Device

Next, the electrophoresis display device to which the electrophoresis sheet of the invention is applied (electrophoresis device of the invention) will be described.

Figure 4:
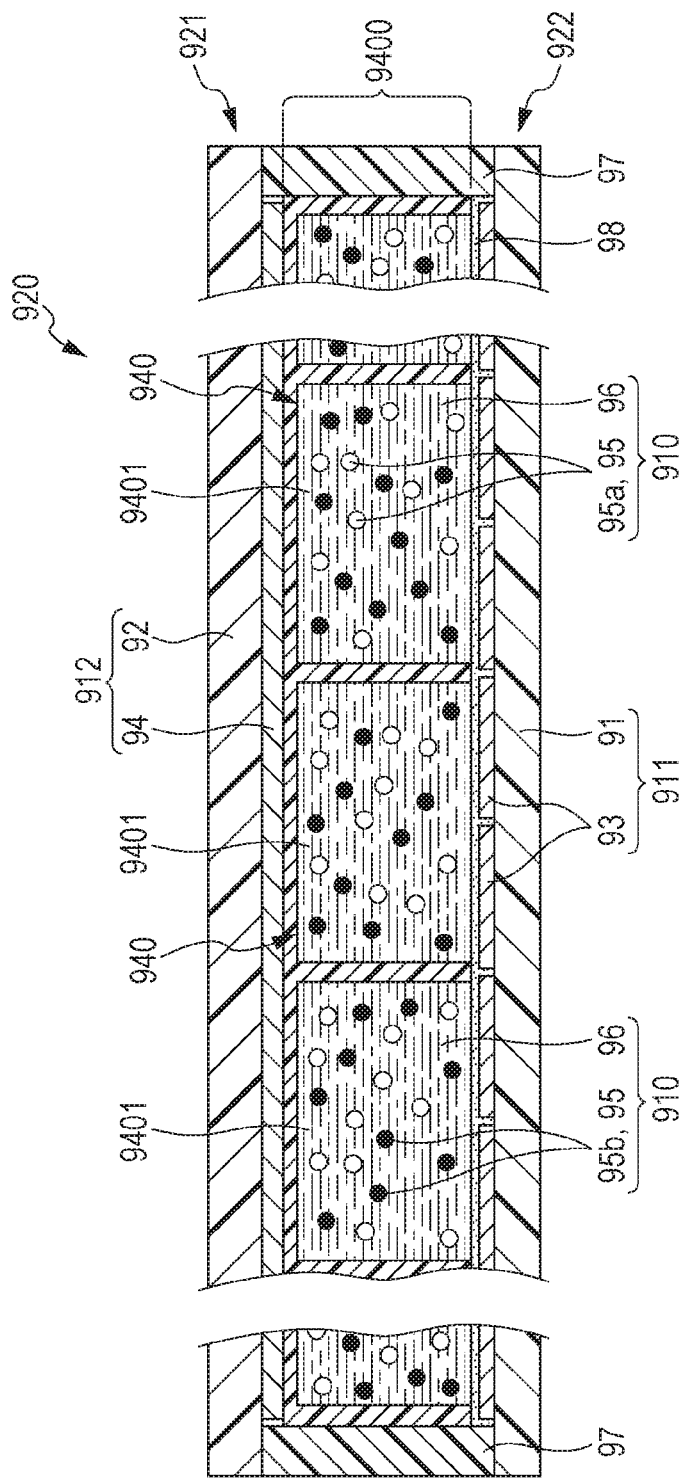
FIG. 4 is a view schematically illustrating a longitudinal cross-section of an embodiment of an electrophoresis display device.
Figure 5:
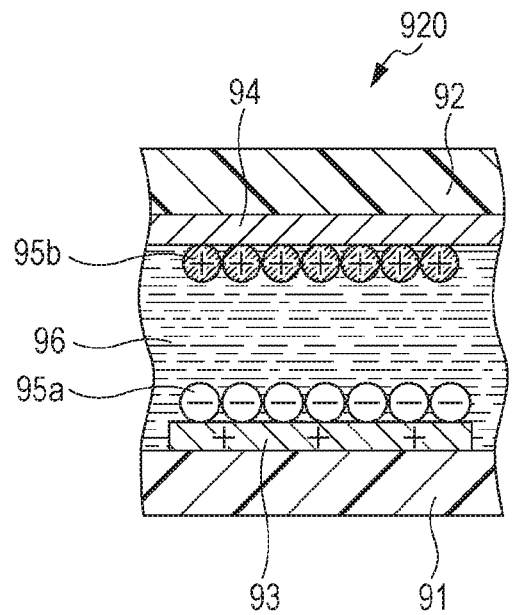
FIG. 5 is a schematic view illustrating an operation principle of the electrophoresis display device shown in FIG. 4.
Figure 6:
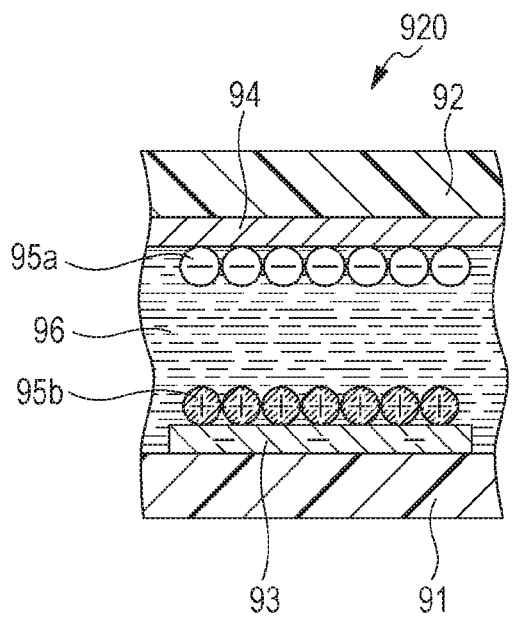
FIG. 6 is a schematic view illustrating an operation principle of the electrophoresis display device shown in FIG. 4.

FIG. 4 is a view schematically showing a longitudinal cross-section of the embodiment of the electrophoresis display device and FIGS. 5 and 6 are schematic views showing an operation principle of the electrophoresis display device shown in FIG. 4. Below, for ease of description, description will be provided with the upper side in FIGS. 4 to 6 as "up" and the lower side as "down".

The electrophoresis display device 920 shown in FIG. 4 includes an electrophoresis display sheet (front plane) 921, a circuit substrate (back plane) 922, an adhesive layer 98 that bonds the electrophoresis display sheet 921 and the circuit substrate 922, and a sealing portion 97 that hermetically seals the gap between the electrophoresis display sheet 921 and the circuit substrate 922.

The electrophoresis display sheet (electrophoresis sheet of the invention) 921 includes a substrate 912 provided with a plate-like base portion 92 and a second electrode 94 provided on the lower surface of the base portion 92 and a display layer 9400 which is provided on the lower surface (one surface) of the substrate 912 and configured by a dividing wall 940 formed in a matrix, and the electrophoresis dispersion liquid 910.

Meanwhile, the circuit substrate 922 includes a counter substrate 911 provided with a plate-like base portion 91 and a plurality of first electrodes 93 provided on the upper surface of the base portion 91, a circuit (not shown) which is provided on the counter substrate 911 (base portion 91) and includes a switching element such as a TFT, and a driving IC (not shown) by which the switching element is driven.

Below, the configuration of each portion will be sequentially described.

The base portions 91 and 92 are respectively configured by sheet-like (flat plate-like) members, and each member arranged therebetween has a supporting and protecting function.

Although each base portion 91 and 92 may be either flexible or hard, flexible is preferable. By using flexible base portions 91 and 92, it is possible to obtain a flexible electrophoresis display device 920, that is, an electrophoresis display device 920 useful in the construction of electronic paper.

In a case where each base portion (base material layer) 91 and 92 have flexibility, it is preferable that these each be configured by a resin material.

The average thickness of the base portions 91 and 92 are each set, as appropriate, according to the constituent materials, usage or the like, and although not particularly limited, approximately 20 to 500 μm is preferable, and approximately 25 to 250 μm is more preferable.

A layered (film-like) first electrode 93 and second electrode 94 are respectively provided on the surface of the dividing wall 940 side of the base portions 91 and 92, that is, on the upper surface of the base portion 91 and the lower surface of the base portion 92.

When a voltage is applied between the first electrode 93 and the second electrode 94, an electric field arises therebetween, and the electric field acts on the electrophoretic particles (electrophoretic particles of the invention) 95.

In the embodiment, the second electrode 94 is the common electrode, and the first electrode 93 is an individual electrode (pixel electrode connected to the switching element) divided in a matrix-shape (grid shape), and the parts where the second electrode 94 and one first electrode 93 configure one pixel electrode.

The constituent material of each electrode 93 and 94 is not particularly limited as long as each substantially has conductivity.

The average thickness of the electrodes 93 and 94 are each set, as appropriate, according to the constituent materials, usage or the like, and although not particularly limited, approximately 0.05 to 10 μm is preferable, and approximately 0.05 to 5 μm is more preferable.

From each of the base portions 91 and 92 and each of the electrodes 93 and 94, the base portion and electrode (in the embodiment, the base portion 92 and the second electrode 94) disposed at the display surface side each have optical transparency, that is, are made substantially transparent (colorless and transparent, colored and transparent, or translucent).

In the electrophoresis display sheet 921, the display layer 9400 is provided in contact with the lower surface of the second electrode 94.

The display layer 9400 is configured so that the electrophoresis dispersion liquid (the above-described electrophoresis dispersion liquid of the invention) 910 is accommodated (sealed) in the plurality of pixel spaces 9401 defined by the dividing wall 940.

The dividing wall 940 is formed between the counter substrate 911 and the substrate 912 so as to be divided in a matrix-form.

Examples of the constituent material of the dividing wall 940 include various types of resin materials such as thermoplastic resins, such as acrylic resins, urethane resins, and olefin resins, and heat-curable resins, such as epoxy resins, melamine resins, and phenolic resins, and it is possible to use one type or a combination of two or more kinds thereof.

The electrophoresis dispersion liquid 910 accommodated in the pixel space 9401, in the embodiment, is a liquid in which two types of colored particles 95b and white particles 95a (at least one type of electrophoretic particles 1) are dispersed (suspended) in a dispersion medium 96, and the above-described electrophoresis dispersion liquid of the invention is applied.

In the electrophoresis display device 920, when a voltage is applied between the first electrode 93 and the second electrode 94, the colored particles 95b and the white particles 95a (electrophoretic particles 1) undergo electrophoresis toward either electrode according to the electric field arising therebetween.

In the embodiment, particles having a negative charge are used as the white particles 95a and particles having a positive charge are used as the colored particles (black particles) 95b. That is, electrophoretic particles 1 in which the base particles 2 are negatively (minus) charged are used as the white particles 95a and electrophoretic particles 1 in which the base particles 2 are positively (plus) charged are used as the colored particles 95b.

In a case of using such electrophoretic particles 1, when the first electrode 93 has a positive potential, the colored particles 95b move to the second electrode 94 side and gather at the second electrode 94 as illustrated in FIG. 5 Meanwhile, the white particles 95a move to the first electrode 93 side and gather on the first electrode 93. Therefore, when the electrophoresis display device 920 is seen from above (display surface side), the color of the colored particles 95b is visible, that is, black is visible.

Conversely, when the first electrode 93 has a negative potential, the colored particles 95b move to the first electrode 93 side and gather at the first electrode 93, as illustrated in FIG. 6 Meanwhile, the white particles 95a move to the second electrode 94 side and gather on the second electrode 94. Therefore, when the electrophoresis display device 920 is seen from above (display surface side), the color of the white particles 95a is visible, that is, white is visible.

In such a configuration, by setting the charging amounts of the white particle 95a and the colored particles 95b (electrophoretic particles 1), the polarity of the electrode 93 or 94, and the potential between the electrodes 93 and 94, as appropriate, desired information (image) is displayed on the display surface side of the electrophoresis display device 920 according to the color combination of the white particles 95a and the colored particles 95b, and the number and the like of particles that gather at the electrodes 93 and 94.

It is preferable for the specific gravity of the electrophoretic particles 1 to be set to be substantially the same as the specific gravity of the dispersion medium 96. In so doing, it is possible for the electrophoretic particles 1 to retain a fixed position in the dispersion medium 96 for a long period of time even after the application of the voltage between the electrodes 93 and 94 is stopped. That is, the information displayed on the electrophoresis display device 920 is held for a long period of time.

It is preferable that the average particle diameter of the electrophoretic particles 1 be approximately 0.1 to 10 μm, and approximately 0.1 to 7.5 μm is more preferable. By having the average particle diameter of the electrophoretic particles 1 in the above range, it is possible to reliably prevent aggregation between the electrophoretic particles 1 or precipitation in the dispersion medium 96, and as a result, it is possible to favorably prevent deterioration of the display quality of the electrophoresis display device 920.

In the embodiment, the electrophoresis display sheet 921 and the circuit substrate 922 are bonded via the adhesive layer 98. Accordingly, it is possible for the electrophoresis display sheet 921 and the circuit substrate 922 to be more reliably fixed.

Although the average thickness of the adhesive layer 98 is not particularly limited, approximately 1 to 30 μm is preferable, and approximately 5 to 20 μm is more preferable.

The sealing portion 97 is provided between the base portions 91 and 92 along the edge portions thereof. Each electrode 93 and 94, the display layer 9400, and the adhesive layer 98 are hermetically sealed by the sealing portion 97. Accordingly, it is possible for moisture to be prevented from infiltrating into the electrophoresis display device 920 and to more reliably prevent the deterioration of the display performance of the electrophoresis display device 920.

It is possible for the same materials as the examples of the constituent materials of the above-described dividing wall 940 to be used as the constituent material of the sealing portion 97.

Electronic Apparatus

Next, the electronic apparatus of the invention will be described.

The electronic apparatus of the invention is provided with the electrophoresis display device 920 as described above.

Electronic Paper

First, an embodiment of a case where the electronic apparatus of the invention is applied to electronic paper will be described.

Figure 7:
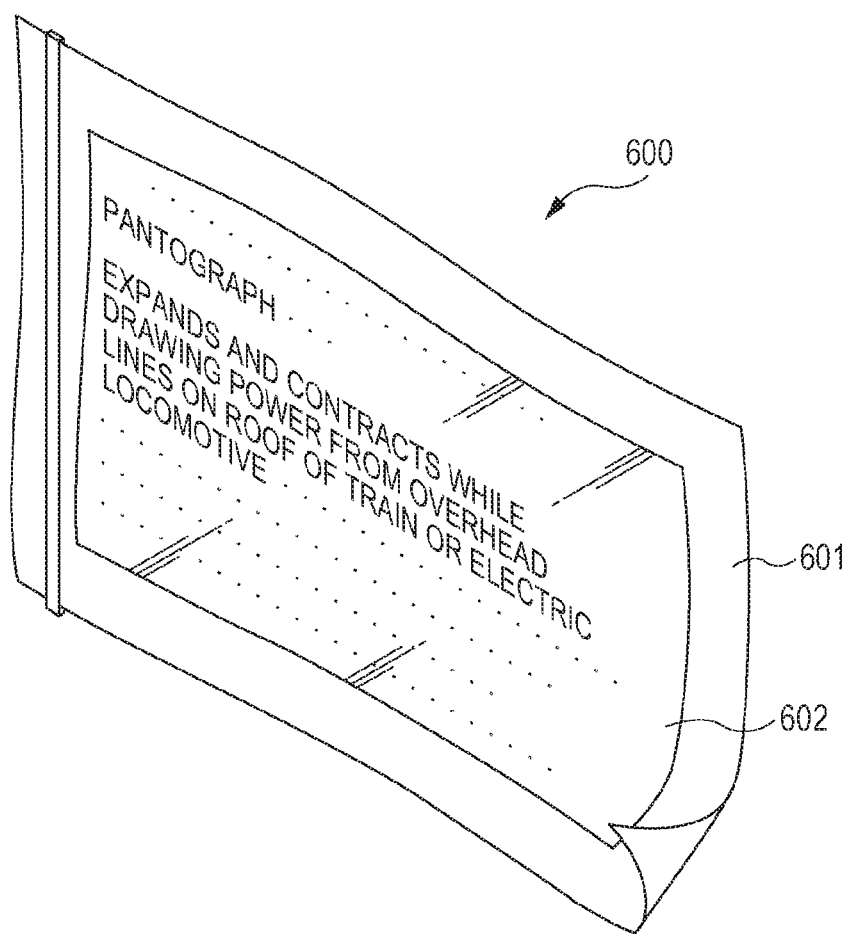
FIG. 7 is a perspective view illustrating an embodiment of a case where an electronic apparatus of the invention is applied to an electronic paper.

FIG. 7 is a perspective view illustrating an embodiment of a case where the electronic apparatus of the invention is applied to an electronic paper.

The electronic paper 600 shown in FIG. 7 is provided with a main body 601 formed of a rewritable sheet having the same texture and flexibility as paper, and a display unit 602.

In the electronic paper 600, the display unit 602 is configured by the electrophoresis display device 920 as described above.

Display

Next, an embodiment of a case where the electronic apparatus of the invention is applied to a display will be described.

Figure 8:
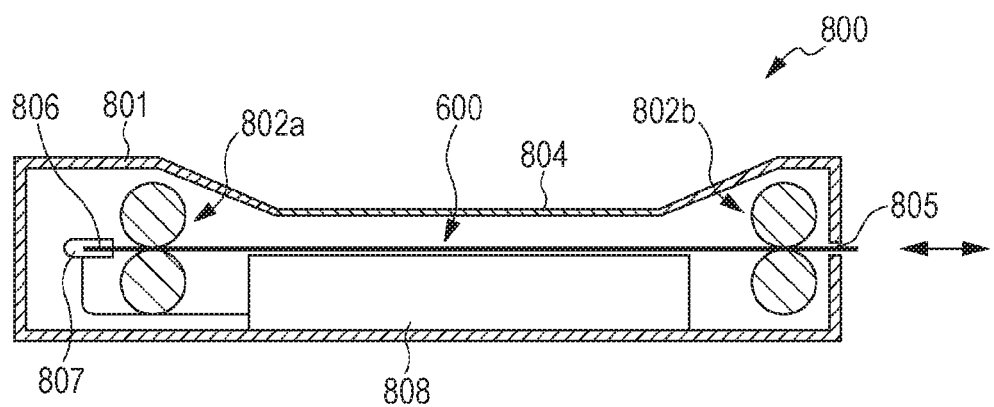
FIG. 8 is a view illustrating an embodiment of a case where the electronic apparatus of the invention is applied to a display.
Figure 9:
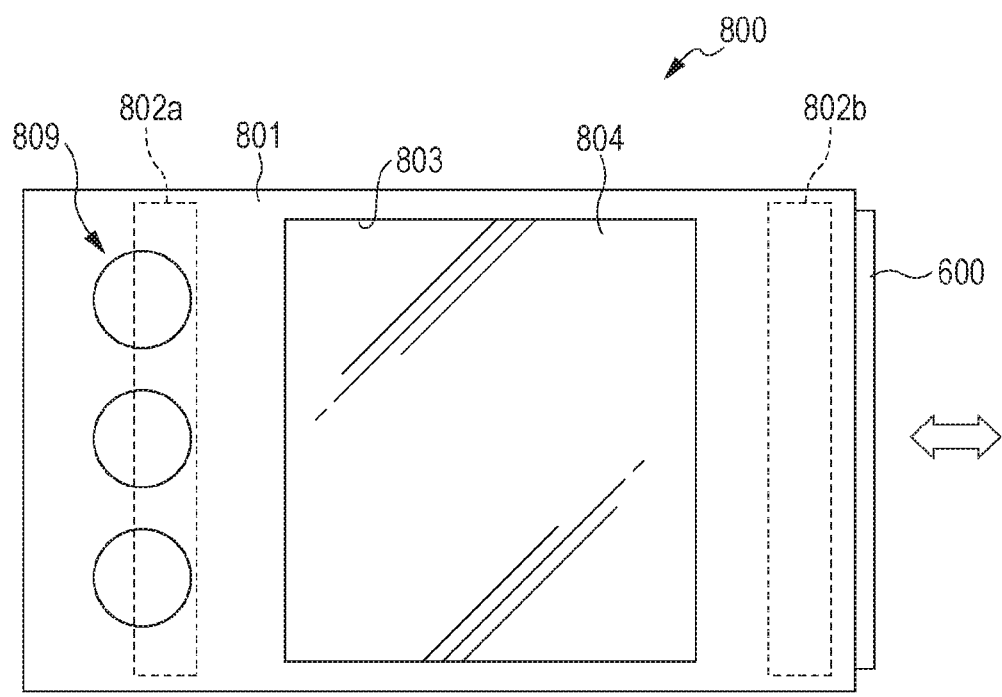
FIG. 9 is a view illustrating an embodiment of a case where the electronic apparatus of the invention is applied to a display.
Figure 10:
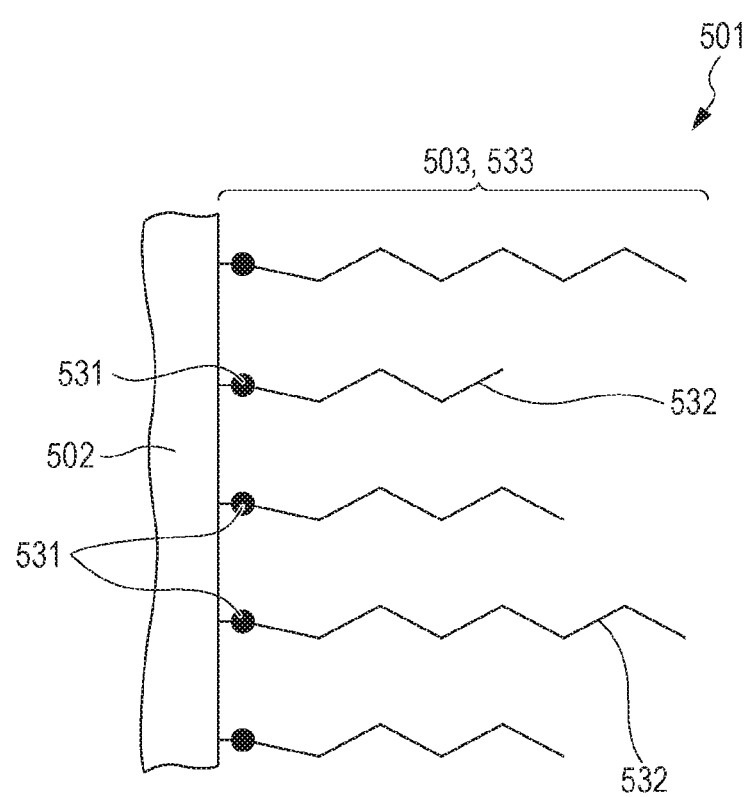
FIG. 10 is a view schematically illustrating a longitudinal cross-section of a structure in an electrophoretic particle of the related art.

FIGS. 8 and 9 are views showing an embodiment of a case where the electronic apparatus of the invention is applied to a display. Among these, FIG. 8 is a cross-sectional view, and FIG. 9 is a plan view.

The display (display device) 800 shown in FIGS. 8 and 9 is provided with a main body unit 801, and an electronic paper 600 provided to be freely detachable with respect to the main body unit 801.

The main body unit 801 has an insertion port 805 allowing insertion of the electronic paper 600 formed in the side thereof (right side in FIG. 8), and is also provided with two sets of transport roller pairs 802a and 802b in the interior thereof. When the electronic paper 600 is inserted inside the main body unit 801 through the insertion port 805, the electronic paper 600 is placed in the main body unit 801 in a state of being pinched by the transport roller pairs 802a and 802b.

A rectangular hole portion 803 is formed in the display surface side of the main body unit 801 (front side of the paper surface in FIG. 9) and a transparent glass plate 804 is fitted into the hole portion 803. Accordingly, it is possible to view the electronic paper 600 in a state of being placed in the main body unit 801 from outside the main body unit 801. That is, the display surface in the display 800 is configured by the electronic paper 600 placed in the main body unit 801 being viewed through the transparent glass plate 804.

A terminal unit 806 is provided on the insertion direction tip portion of the electronic paper 600 (in FIG. 8, the left side), and a socket 807 to which the terminal unit 806 is connected in a state in which the electronic paper 600 is placed in the main body unit 801 is provided in the interior of the main body unit 801. A controller 808 and an operation unit 809 are electrically connected to the socket 807.

In the display 800, the electronic paper 600 is placed in the main body unit 801 to be freely detachable, and may be carried and used in a state of being removed from the main body unit 801.

In the display 800, the electronic paper 600 is configured by the electrophoresis display device 920 as described above.

The electronic apparatus of the invention is not limited to application to those described above and examples include televisions, view finder-type or direct-view monitor-type video tape recorders, car navigation systems, pagers, electronic organizers, calculators, electronic newspapers, word processors, personal computers, workstations, video phones, POS terminals, electronic apparatuses provided with a touch panel, such as smartphones, tablet terminals, clocks, watches, and wearable devices, and the electrophoresis display device 920 can be applied the display unit of these various electronic apparatuses.

Above, although the electrophoretic particles, the method of manufacturing electrophoretic particles, the electrophoresis dispersion liquid, the electrophoresis sheet, the electrophoresis device, and the electronic apparatus of the invention were described based in the embodiments shown in the drawings, the invention is not limited thereto and the configuration of each part may be changed to an arbitrary configuration having the same function. Other arbitrary configurations may be added to the invention.

One or two or more steps with an arbitrary purpose may be added to the method of manufacturing of the electrophoretic particles of the invention.

EXAMPLES

Next, specific examples the invention will be described. Method of Manufacturing Electrophoretic Particle, Preparation of Electrophoresis Dispersion Liquid and Evaluation of Electrophoresis Dispersion Liquid 1. Synthesis of First Compound (Block Copolymer)

1-1. Synthesis of Dispersion Portion 60 g of a silicone macromonomer ("Silaplane FM-0726", manufactured by JNC Corporation) with a molecular weight of 16,000, 250 mg of 2-cyano-2-propylbenzodithioate, and 100 mg of azobis isobutyronitrile were added to a flask, and, after the system was nitrogen converted, 22.5 mL of ethyl acetate was further added, and thereafter, stirred while heated at 75° C. for 8 hours to polymerize a silicone macromonomer. This was cooled to room temperature to finish the reaction, and the solvent removed to obtain a silicone polymer reaction solution.

The obtained reaction solution was purified with a silica gel column with the mixed solvent of hexane and chloroform as a developing solvent, and the impurities removed to isolate the silicone polymer. It was confirmed by gel permeation chromatography with toluene as the developing solvent that the result of measuring the weight average molecular weight (Mw) of the obtained silicone polymer was 48,000.

1-2. Synthesis of Bonding Portion 27.5 mg of azobisisobutyronitrile and 200 mg of 3-methacryloxypropyltriethoxysilane ("KBE-503", manufactured by Shin-Etsu Silicone Co., Ltd.) were added to 10 g of the silicone polymer obtained above in a flask, and, after the system was nitrogen converted, ethyl acetate was further added, and thereafter, polymerization was performed while heating and stirring at 75° C. for 4 hours. This was cooled to room temperature to finish the reaction, and the solvent removed to obtain the first compound (block copolymer) in which the dispersion portion and the bonding portion are connected.

2. Synthesis of Third Compound 4.5 g of 3-(trimethoxysilyl)propylamine (manufactured by Tokyo Chemical Industry Co., Ltd., Mw 179.3) was added dropwise to a flask in which 4.5 g of 4-tert-butylbenzoic acid (manufactured by Tokyo Chemical Industry Co., Ltd., Mw: 178.2), 3.9 g of 1-ethyl-3-(3-dimethyl aminopropyl)-carbodiimide hydrochloride (EDC, manufactured by Tokyo Chemical Industry Co., Ltd., Mw 155.3) as a condensation agent for forming an amide bond, 0.6 g of 4-(dimethyl amino)pyridine (DMAP, manufactured by Tokyo Chemical Industry Co., Ltd., Mw 122.2), and 20 mL of anhydrous methylene chloride were mixed, and stirred for five hours. Accordingly, the amino group and the carboxylic acid were condensed. The obtained reaction product was purified with a silica gel column and the third compound was obtained.

3. Preparation of Electrophoresis Dispersion Liquid Including White Particles (Positively Charged Particles)

Example 1A

First, 0.10 g of the obtained third compound and 60 g of titanium oxide particles with an average particle diameter of 250 nm (manufactured by Ishihara Sangyo Kaisha, Ltd., "CR-50") were mixed in 300 mL of toluene, and, after being subjected to ultrasound processing for one hour, heated under reflux for four hours at 130° C. Thereafter, after the particles were washed with toluene, removing the unreacted third compound, the remaining toluene was dried and distilled, and white electrophoretic particles to which the third compound is bonded were obtained.

Next, 60 g of the white electrophoretic particles was added to the silicone oil (manufactured by Shin-Etsu Silicon Corporation, "KF-96-20 cs"), and, after 12 g of the obtained first compound (block copolymer) and 1.2 g of n-butyltrimethoxy silane (manufactured by Gelest Inc., "SIB 1988", Mw 178.3) as the second compound were added and subjected to ultrasound processing for one hour, heating and stirring were performed for four hours at 180° C., thereby obtaining electrophoretic particles in which the first compound and the second compound were connected to the particle. The electrophoresis dispersion liquid including the white particles was obtained by removing the unreacted first and second compounds from the post-reaction solution and substituting the silicone oil with "KF-96L-2cs" manufactured by Shin-Etsu Chemical Co., Ltd.

The addition amounts of the first, second, and third compounds in the obtained electrophoretic particles were 2.5 wt %, 1.0 wt % and 0.1 wt %, respectively, to the titanium oxide particles.

Example 2A

Other than adding 0.40 g of the third compound, the electrophoresis dispersion liquid including the white particles was obtained similarly to Example 1A.

The addition amounts of the first, second, and third compounds in the obtained electrophoretic particles were 2.5 wt %, 1.0 wt %, and 0.3 wt %, respectively, to the titanium oxide particles.

Example 3A

Other than adding 1.50 g of the third compound, the electrophoresis dispersion liquid including the white particles was obtained similarly to Example 1A.

The addition amounts of the first, second, and third compounds in the obtained electrophoretic particles were 2.5 wt %, 1.0 wt %, 1.0 wt %, respectively, to the titanium oxide particles.

Example 4A

Other than adding 0.40 g of the third compound, and further adding 0.1 g of the second compound, the electrophoresis dispersion liquid including the white particles was obtained similarly to Example 1A.

The addition amounts of the first, second, and third compounds in the obtained electrophoretic particles were 2.5 wt %, 0.1 wt %, and 0.3 wt %, respectively, to the titanium oxide particles.

Example 5A

Other than adding 0.40 g of the third compound, and further adding 10 g of 1,1,1,3,3,3-hexamethyl disilazane (HMDS, manufactured by Tokyo Chemical Industry Co., Ltd., Mw 161.4) instead of n-butyl trimethoxysilane as the second compound, the electrophoresis dispersion liquid including the white particles was obtained similarly to Example 1A.

The addition amounts of the first, second, and third compounds in the obtained electrophoretic particles were 2.5 wt %, 1.0 wt %, and 0.3 wt %, respectively, to the titanium oxide particles.

Example 6A

Other than adding 0.40 g of the third compound, and further adding 1 g of HMDS as the second compound, the electrophoresis dispersion liquid including the white particles was obtained similarly to Example 1A.

The addition amounts of the first, second, and third compounds in the obtained electrophoretic particles were 2.5 wt %, 0.1 wt %, and 0.3 wt %, respectively, to the titanium oxide particles.

Comparative Example 1A

Other than not adding the second compound, and omitting bonding of the second compound to the titanium oxide particles, the electrophoresis dispersion liquid including the white particles was obtained similarly to Example 2A.

Comparative Example 2A

Other than not adding the second and third compounds, and omitting bonding of the second and third compounds to the titanium oxide particles, the electrophoresis dispersion liquid including the white particles was obtained similarly to Example 1A.

4. Preparation of Electrophoresis Dispersion Liquid Including Black Particles (Negatively Charged Particles)

Example 1B 0.10 g of the third compound (3,3,3-trifluoropropyl) trimethoxysilane (manufactured by Gelest Inc., "SIT 8372.0", Mw 218.3) and 50 g of titanium nitride particles (manufactured by Mitsubishi Materials Corporation, "SC13MT") were mixed in 250 mL of toluene, and, after being subjected to ultrasound processing for one hour, heating under reflux was performed for four hours at 130° C. Thereafter, after the particles were washed with toluene, removing the unreacted third compound, the remaining toluene was dried and distilled, and black electrophoretic particles to which the third compound is bonded were obtained.

Next, 50 g of the black electrophoretic particles was added to the silicone oil (manufactured by Shin-Etsu Silicon Corporation, "KF-96-20 cs"), and, after 20 g of the obtained first compound (block copolymer) and 1.2 g of n-butyltrimethoxy silane as the second compound were added and subjected to ultrasound processing for one hour, heating and stirring were performed for four hours at 180° C., thereby obtaining electrophoretic particles in which the first compound and the second compound were connected to the particle.

The electrophoresis dispersion liquid including the black particles was obtained by removing the unreacted first and second compounds from the post-reaction solution and substituting the silicone oil with "KF-96L-2cs" manufactured by Shin-Etsu Chemical Co., Ltd.

The addition amounts of the first, second, and third compounds in the obtained electrophoretic particles were 4.5 wt %, 1.0 wt % and 0.1 wt %, respectively, to the titanium nitride particles.

Example 2B

Other than adding 0.40 g of the third compound, the electrophoresis dispersion liquid including the black particles was obtained similarly to Example 1B.

The addition amounts of the first, second, and third compounds in the obtained electrophoretic particles were 4.5 wt %, 1.0 wt % and 0.3 wt %, respectively, to the titanium nitride particles.

Example 3B

Other than adding 1.50 g of the third compound, the electrophoresis dispersion liquid including the black particles was obtained similarly to Example 1B.

The addition amounts of the first, second, and third compounds in the obtained electrophoretic particles were 4.5 wt %, 1.0 wt % and 1.0 wt %, respectively, to the titanium nitride particles.

Example 4B

Other than adding 0.40 g of the third compound, and further adding 0.1 g of the second compound, the electrophoresis dispersion liquid including the black particles was obtained similarly to Example 1B.

The addition amounts of the first, second, and third compounds in the obtained electrophoretic particles were 4.5 wt %, 0.1 wt % and 0.3 wt %, respectively, to the titanium nitride particles.

Example 5B

Other than adding 0.40 g of the third compound, and further adding 10 g of HMDS instead of n-butyl trimethoxysilane as the second compound, the electrophoresis dispersion liquid including the black particles was obtained similarly to Example 1B.

The addition amounts of the first, second, and third compounds in the obtained electrophoretic particles were 4.5 wt %, 1.0 wt % and 0.3 wt %, respectively, to the titanium nitride particles.

Example 6B

Other than adding 0.40 g of the third compound, and further adding 1 g of HMDS as the second compound, the electrophoresis dispersion liquid including the black particles was obtained similarly to Example 1B.

The addition amounts of the first, second, and third compounds in the obtained electrophoretic particles were 4.5 wt %, 0.1 wt % and 0.3 wt %, respectively, to the titanium nitride particles.

Comparative Example 1B

Other than not adding the second compound, and omitting bonding of the second compound to the titanium nitride particles, the electrophoresis dispersion liquid including the black particles was obtained similarly to Example 2B.

Comparative Example 2B

Other than not adding the second and third compounds, and omitting bonding of the second and third compounds to the titanium nitride particles, the electrophoresis dispersion liquid including the black particles was obtained similarly to Example 1B.

5. Preparation of Electrophoresis Dispersion Liquid Including White Particles and Black Particles An electrophoresis dispersion liquid including white particles and black particles mixed so that the white and black particles are combined, and the volume ratio of the white electrophoresis dispersion liquid and the black electrophoresis dispersion liquid is 10:1, for the electrophoresis dispersion liquid containing the white particles of Examples 1A to 6A and Comparative Examples 1A and 2A and the electrophoresis dispersion liquid including the black particles of Examples 1B to 6B and Comparative Examples 1B and 2B.

6. Evaluation of Electrophoresis Dispersion Liquid 6-1.

First, the dispersibility and migration characteristics as below were evaluated for each of the electrophoresis dispersion liquids prepared in the above 3. to 4.

Evaluation of Dispersibility

That is, first, a comb electrode substrate for evaluation on which a comb electrode with an inter-electrode distance of 100 μm is formed was prepared on a glass substrate.

Next, after diluting the electrophoresis dispersion liquid so that the content rate of the electrophoretic particles is 1 wt %, the diluted electrophoresis dispersion liquid was added dropwise onto the comb electrode of the comb electrode substrate for evaluation.

Next, the drop-wise added electrophoresis dispersion liquid was observed using a microscope.

The results thereof were evaluated based on the evaluation criteria shown below.

Evaluation Standards

A: Aggregation of the electrophoretic particles in the electrophoresis dispersion liquid is not identified, and the electrophoretic particles are evenly spread in the electrophoresis dispersion liquid.

B: Slight aggregation of the electrophoretic particles identified in the electrophoresis dispersion liquid.

C: Partial aggregation of the electrophoretic particles identified in the electrophoresis dispersion liquid.

D: Large amounts of aggregation of the electrophoretic particles identified in the electrophoresis dispersion liquid.

Evaluation of Migration Properties

Next, 15 V was applied between the comb electrodes in a state with the electrophoresis dispersion liquid added dropwise on the comb electrode substrate, and the migration properties of the electrophoretic particles at this time were observed using a microscope.

The results thereof were evaluated based on the evaluation criteria shown below.

Evaluation Standards

4: The electrophoretic particles in the electrophoresis dispersion liquid migrated extremely quickly.

3: The electrophoretic particles in the electrophoresis dispersion liquid migrated quickly.

2: The electrophoretic particles in the electrophoresis dispersion liquid migrated slowly.

1: Reverse charged electrophoretic particles were mixed in the electrophoresis dispersion liquid. Alternatively, there was substantially no migration.

The evaluation results thereof are illustrated in Tables 1 and 2.

TABLE 1

| | Particles (White Particles) | First Compound | | Second Compound | | Third Compound | | Evaluation | |
|---|---|---|---|---|---|---|---|---|---|
| | | First Monomer | Second Monomer | Type | Addition Amount (wt %) | Type | Addition Amount (wt %) | Dispersibility | Migration Properties |
| Example 1A | CR50 | 16k Siloxane MA | KBE-503 | n-butyl trimethoxysilane | 1.0 | Third Compound synthesized in 2. | 0.1 | B | 2 |
| Example 2A | CR50 | 16k Siloxane MA | KBE-503 | n-butyl trimethoxysilane | 1.0 | | 0.3 | A | 3 |
| Example 3A | CR50 | 16k Siloxane MA | KBE-503 | n-butyl trimethoxysilane | 1.0 | | 1.0 | A | 4 |
| Example 4A | CR50 | 16k Siloxane MA | KBE-503 | n-butyl trimethoxysilane | 0.1 | | 0.3 | A | 3 |
| Example 5A | CR50 | 16k Siloxane MA | KBE-503 | hexamethyl disilazane | 1.0 | | 0.3 | A | 3 |
| Example 6A | CR50 | 16k Siloxane MA | KBE-503 | hexamethyl disilazane | 0.1 | | 0.3 | A | 3 |
| Comparative Example 1A | CR50 | 16k Siloxane MA | KBE-503 | — | — | | 0.3 | B | 3 |
| Comparative Example 2A | CR50 | 16k Siloxane MA | KBE-503 | — | — | — | — | C | 1 |

TABLE 2

| | Particles (Black Particles) | First Compound | | Second Compound | | Third Compound | | Evaluation | |
|---|---|---|---|---|---|---|---|---|---|
| | | First Monomer | Second Monomer | Type | Addition Amount (wt %) | Type | Addition Amount (wt %) | Dispersibility | Migration Properties |
| Example 1B | SC13MT | 16k Siloxane MA | KBE-503 | n-butyl trimethoxysilane | 1.0 | (3,3,3-TRIFLUOROPROPYL) TRIMETHOXYSILANE | 0.1 | B | 2 |
| Example 2B | SC13MT | 16k Siloxane MA | KBE-503 | n-butyl trimethoxysilane | 1.0 | | 0.3 | A | 3 |
| Example 3B | SC13MT | 16k Siloxane MA | KBE-503 | n-butyl trimethoxysilane | 1.0 | | 1.0 | A | 4 |
| Example 4B | SC13MT | 16k Siloxane MA | KBE-503 | n-butyl trimethoxysilane | 0.1 | | 0.3 | A | 3 |
| Example 5B | SC13MT | 16k Siloxane MA | KBE-503 | hexamethyl disilazane | 1.0 | | 0.3 | A | 3 |
| Example 6B | SC13MT | 16k Siloxane MA | KBE-503 | hexamethyl disilazane | 0.1 | | 0.3 | A | 3 |
| Comparative Example 1B | SC13MT | 16k Siloxane MA | KBE-503 | — | — | | 0.3 | B | 3 |
| Comparative Example 2B | SC13MT | 16k Siloxane MA | KBE-503 | — | — | — | — | C | 1 |

As is clear from Tables 1 and 2, in the electrophoresis dispersion liquid of each example, the electrophoretic particles exhibited superior dispersibility and migration characteristics in the electrophoresis dispersion liquid.

In contrast, in the electrophoresis dispersion liquid of each Comparative Example, the electrophoretic particles demonstrated results in which the dispersibility and the migration characteristics were not superior caused by omitting the connection of the second compound (and further, third compound) to the base particle.

6-2.

The display performance as outlined below were evaluated for the electrophoresis dispersion liquids prepared in the above 5.

Evaluation of Display Performance

That is, the white reflectivity when white is displayed and the black reflectivity when black is displayed were measured with the electrophoresis dispersion liquids prepared in 5. Above were each poured into a transparent electrode cell with a thickness of 50 μm, and the contrast was calculated therefrom.

The results thereof were evaluated based on the evaluation criteria shown below.

Evaluation Standards
A: Contrast of 25 or higher.
B: Contrast of 20 or more to less than 25.
C: Contrast of 15 or more to less than 20.
D: Contrast of 5 or more to less than 15.
E: The contrast is less than 5.

The evaluation results are shown in Table 3.

TABLE 3

| | Example 1A | Example 2A | Example 3A | Example 4A | Example 5A | Example 6A | Comparative Example 1A | Comparative Example 2A |
|---|---|---|---|---|---|---|---|---|
| Example 1B | B | A | B | C | A | C | D | D |
| Example 2B | A | A | B | B | A | B | D | D |

TABLE 3-continued

|  | Example 1A | Example 2A | Example 3A | Example 4A | Example 5A | Example 6A | Comparative Example 1A | Comparative Example 2A |
|---|---|---|---|---|---|---|---|---|
| Example 3B | B | C | C | C | C | C | D | D |
| Example 4B | C | B | C | C | B | C | D | D |
| Example 5B | A | A | B | B | A | B | D | D |
| Example 6B | C | B | C | C | B | C | D | D |
| Comparative Example 1B | D | D | D | D | D | D | E | D |
| Comparative Example 2B | D | D | D | D | D | D | D | D |

As is apparent from Table 3, in the electrophoresis dispersion liquids with the combination of the white particle of each example and the black particles of each example, the electrophoretic particles demonstrated superior contrast, that is, display performance without aggregation arising between the white particles and the black particles in the electrophoresis dispersion liquid.

In contrast, in the electrophoretic dispersion with the combination including the comparative example of at least one of the white particles and the black particles, aggregation arose between the white particles and the black particles caused by leaving out the connection of the second compound to the base particles, and, as a result, the results demonstrated that the contrast, that is, display performance, was deteriorated.

The entire disclosure of Japanese Patent Application No. 2015-185320, filed Sep. 18, 2015 is expressly incorporated by reference herein.

What is claimed is:

1. An electrophoretic particle, comprising:
a particle including a first functional group on a surface; and
a first compound, a second compound, and a third compound bonded to the particle,
wherein the first compound is a block copolymer that includes a dispersion portion derived from a first monomer including a site that contributes to dispersibility in a dispersion medium, and a bonding portion derived from a second monomer including a second functional group having reactivity with the first functional group, and is connected to the particle by reacting the functional group and the second functional group in the bonding portion,
the second compound has a lower molecular weight than the first compound, includes a non-polar group and the second functional group, and is connected to the particle by the second functional group reacting with the first functional group, and
the third compound has a lower molecular weight than the first compound, includes a charging group and the second functional group, and is connected to the particle by the second functional group reacting with the first functional group.

2. The electrophoretic particle according to claim 1, wherein the second compound is a silane coupling agent that includes the non-polar group and the second functional group.

3. The electrophoretic particle according to claim 1, wherein the second compound is a block copolymer that includes a non-polar portion derived from a third monomer including the non-polar group, and the bonding portion derived from the second monomer including the second functional group.

4. The electrophoretic particle according to claim 1, wherein the non-polar group is a hydrocarbon group.

5. The electrophoretic particle according to claim 1, wherein the molecular weight of the second compound is 100 or more to 1,000 or less.

6. The electrophoretic particle according to claim 1, wherein the third compound is a silane coupling agent that includes the charging group and the second functional group.

7. The electrophoretic particle according to claim 1, wherein the third compound is a block copolymer that includes a charging portion derived from the third monomer including the charging group, and the bonding portion derived from the second monomer including the second functional group.

8. The electrophoretic particle according to claim 1, wherein the charging group includes at least one of a polarization group and an ionic group.

9. The electrophoretic particle according to claim 1, wherein the molecular weight of the third compound is 100 or more to 1,000 or less.

10. The electrophoretic particle according to claim 1, wherein, in the first compound, the bonding portion is formed by 1 or more to 10 or less units derived from the second monomer.

11. The electrophoretic particle according to claim 1, wherein, in the first compound, the first monomer is a silicone macromonomer represented by the following general formula (I).

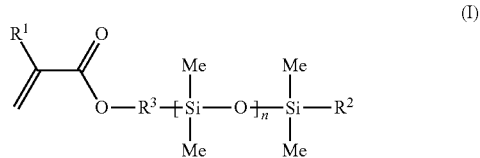

[in the formula, $R^1$ is a hydrogen atom or a methyl group, $R^2$ is a hydrogen atom or an alkyl group having 1 to 4 carbon atoms, $R^3$ is a structure including one type from an alkyl group having 1 to 6 carbon atoms and an ether group of ethylene oxide or propylene oxide, and n is an integer of 0 or more].

12. The electrophoretic particle according to claim 1, wherein the weight average molecular weight of the dispersion portion is 10,000 or more to 100,000 or less.

13. The electrophoretic particle according to claim 1, wherein, when the weight average molecular weight of the dispersion portion is A and the molecular weight of the second compound is B, A/B is 10 or more to 1,000 or less.

14. A method of manufacturing an electrophoretic particle according to claim 1, the method comprising:

connecting the third compound to the particle by reacting the first functional group included in the surface of the particle and the second functional group included in the third compound;

connecting the first compound to the particle at the bonding portion by reacting the first functional group included in the surface of the particle and the second functional group included in the first compound; and connecting the second compound to the particle by reacting the first functional group included in the surface of the particle and the second functional group included in the second compound.

15. A method of manufacturing an electrophoretic particle according to claim 2, the method comprising:

connecting the third compound to the particle at the bonding portion by reacting the first functional group included in the surface of the particle and the second functional group included in the third compound;

connecting the first compound to the particle at the bonding portion by reacting the first functional group included in the surface of the particle and the second functional group included in the first compound; and connecting the second compound to the particle by reacting the first functional group included in the surface of the particle and the second functional group included in the second compound.

16. An electrophoresis dispersion liquid, comprising:
the electrophoretic particles according to claim 1; and
a dispersion medium.

17. The electrophoresis dispersion liquid according to claim 16,
wherein the dispersion medium is silicone oil.

18. An electrophoresis sheet, comprising:
a substrate; and
a structure that is provided on the substrate, and that accommodates the electrophoresis dispersion liquid according to claim 16.

19. An electrophoresis device, comprising:
the electrophoresis sheet according to claim 18.

20. An electronic apparatus comprising:
the electrophoresis device according to claim 19.

* * * * *